US012726412B2

(12) United States Patent
Craig et al.

(10) Patent No.: US 12,726,412 B2
(45) Date of Patent: Sep. 1, 2026

(54) PRIMARY ORCHESTRATOR FOR CONTINUOUS INTEGRATION SYSTEM

(71) Applicant: THE BOEING COMPANY, Arlington, VA (US)

(72) Inventors: James Price Craig, Seattle, WA (US); Timothy Alain Denney, Mountlake Terrace, WA (US); Ngoc Hong Ha Phuong, Brisbane (AU); Juan Carlos Mendo Hernandez, Salamanca (ES); Jose Alberto Rodriguez Alvarez, Madrid (ES)

(73) Assignee: THE BOEING COMPANY, Arlington, VA (US)

( * ) Notice: Subject to any disclaimer, the term of this patent is extended or adjusted under 35 U.S.C. 154(b) by 72 days.

(21) Appl. No.: 18/965,222

(22) Filed: Dec. 2, 2024

(65) Prior Publication Data

US 2026/0156042 A1 Jun. 4, 2026

(51) Int. Cl.
*H04L 41/14* (2022.01)
*H04L 41/069* (2022.01)

(52) U.S. Cl.
CPC ............ *H04L 41/14* (2013.01); *H04L 41/069* (2013.01)

(58) Field of Classification Search
CPC .............................. H04L 41/14; H04L 41/069
See application file for complete search history.

(56) References Cited

U.S. PATENT DOCUMENTS 9,262,148 B2 * 2/2016 Thompson .............. H04L 67/34
10,025,692 B2 7/2018 Wood et al.
10,303,586 B1 5/2019 Falko
10,310,969 B2 6/2019 Bhattacharjee et al.
10,523,529 B2 * 12/2019 Yu ........................ H04L 41/0897
11,301,363 B2 * 4/2022 Malleni ............... G06F 9/44505
2015/0363424 A1 12/2015 Strong et al.
2018/0241651 A1 * 8/2018 Lee ......................... H04L 43/04
2019/0044806 A1 * 2/2019 Sedayao ............... G06F 9/5077
(Continued)

OTHER PUBLICATIONS

"Ship data pipelines with extraordinary velocity," Dagster, https://dagster.io/, retrieved Jul. 30, 2024, pp. 1-13.
(Continued)

*Primary Examiner* — Javier O Guzman
(74) *Attorney, Agent, or Firm* — Moore IP Law

(57) ABSTRACT

A device includes one or more processors configured to obtain, at a primary orchestrator of a system, a notification of a change event from an authoritative source of the system and identify, based on an evaluation precedence network at the primary orchestrator, one or more evaluations to perform in response to the change event. For each identified evaluation, the processor(s) are configured to send, from the primary orchestrator, an evaluation request to a secondary orchestrator of the system to request performance of the evaluation, and receive, from the secondary orchestrator, an evaluation result based on performance of the evaluation. The processor(s) are configured to update the evaluation precedence network to indicate an updated state of evaluation executions based on one or more of the evaluation results. The processor(s) are configured to determine, at the primary orchestrator, whether to generate an additional evaluation request after the evaluation precedence network is updated.

20 Claims, 9 Drawing Sheets

(56) References Cited

U.S. PATENT DOCUMENTS

| | | | | |
|---|---|---|---|---|
| 2020/0042343 | A1* | 2/2020 | Wang | G06F 9/45558 |
| 2020/0084202 | A1* | 3/2020 | Smith | H04W 12/08 |
| 2020/0244546 | A1* | 7/2020 | Tidemann | H04L 41/5009 |
| 2021/0049050 | A1* | 2/2021 | Goodwin | G06F 9/5038 |
| 2022/0050897 | A1* | 2/2022 | Gaddam | G06N 3/006 |
| 2022/0255821 | A1* | 8/2022 | Yousouf | H04L 43/0811 |
| 2022/0374218 | A1* | 11/2022 | Monteiro Vieira | G06F 8/63 |
| 2023/0216582 | A1* | 7/2023 | Johnson | H04B 10/0793 398/1 |
| 2023/0231845 | A1* | 7/2023 | Manoharan | H04L 63/0853 726/3 |
| 2023/0335236 | A1* | 10/2023 | Dambman | G16H 10/40 |
| 2024/0242138 | A1* | 7/2024 | Dhoble | G06Q 10/063 |
| 2025/0013507 | A1* | 1/2025 | MacNamara | G06F 1/26 |
| 2025/0168275 | A1* | 5/2025 | King | H04M 3/42059 |
| 2025/0258905 | A1* | 8/2025 | Chunduru Venkata | G06F 21/53 |
| 2025/0343820 | A1* | 11/2025 | Critelli | H04L 63/20 |

OTHER PUBLICATIONS

"What is Airflow," Apache Airflow, Version 2.10.3, https://airflow.apache.org/docs/apache-airflow/stable/index.html, retrieved Dec. 1, 2024, pp. 1-4.

* cited by examiner

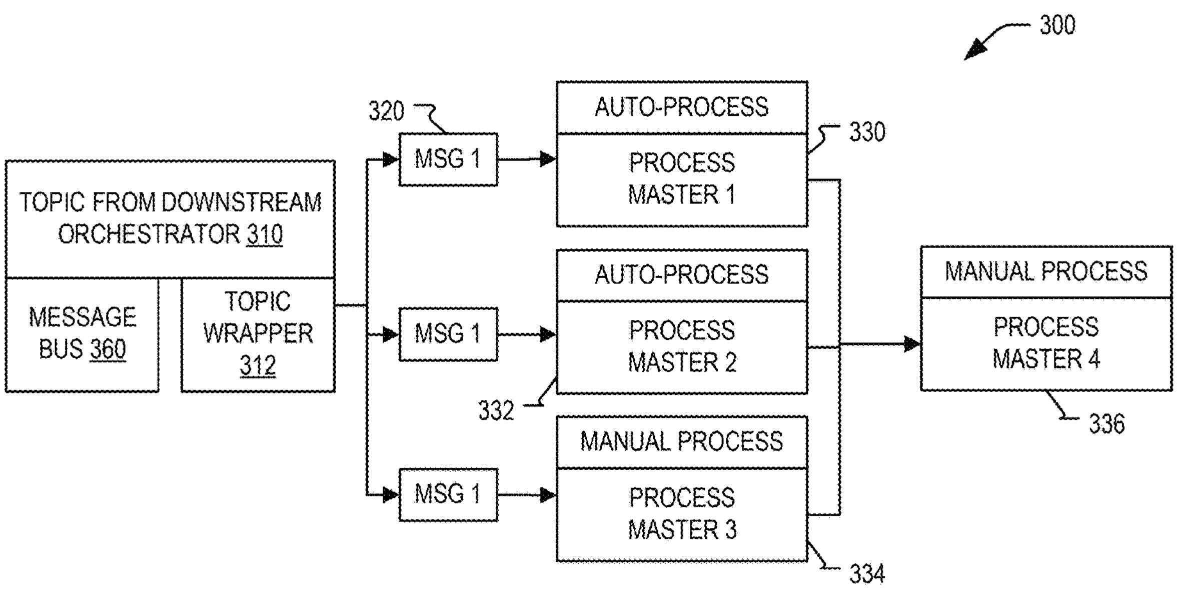
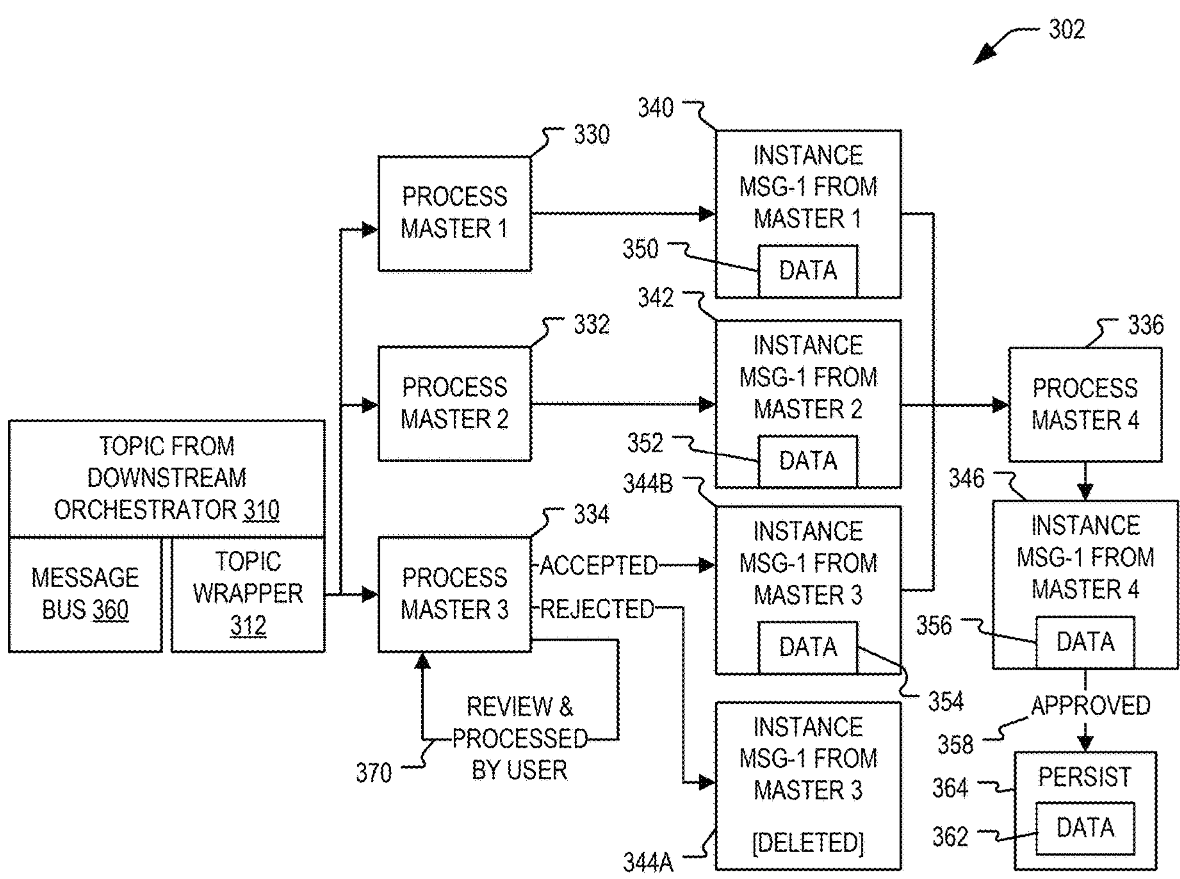
FIG. 3

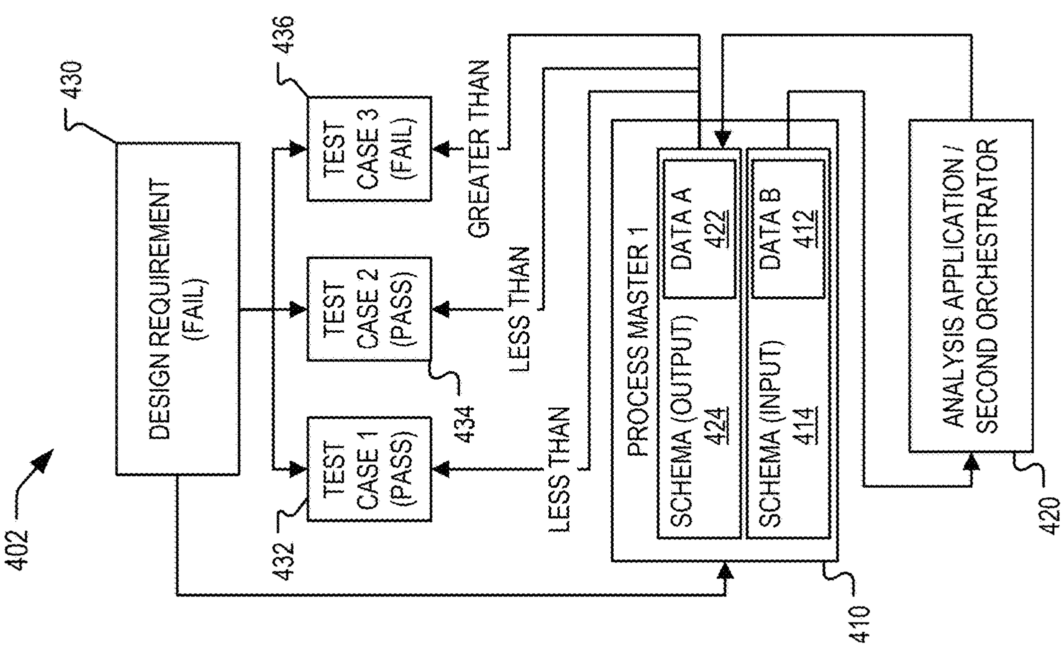
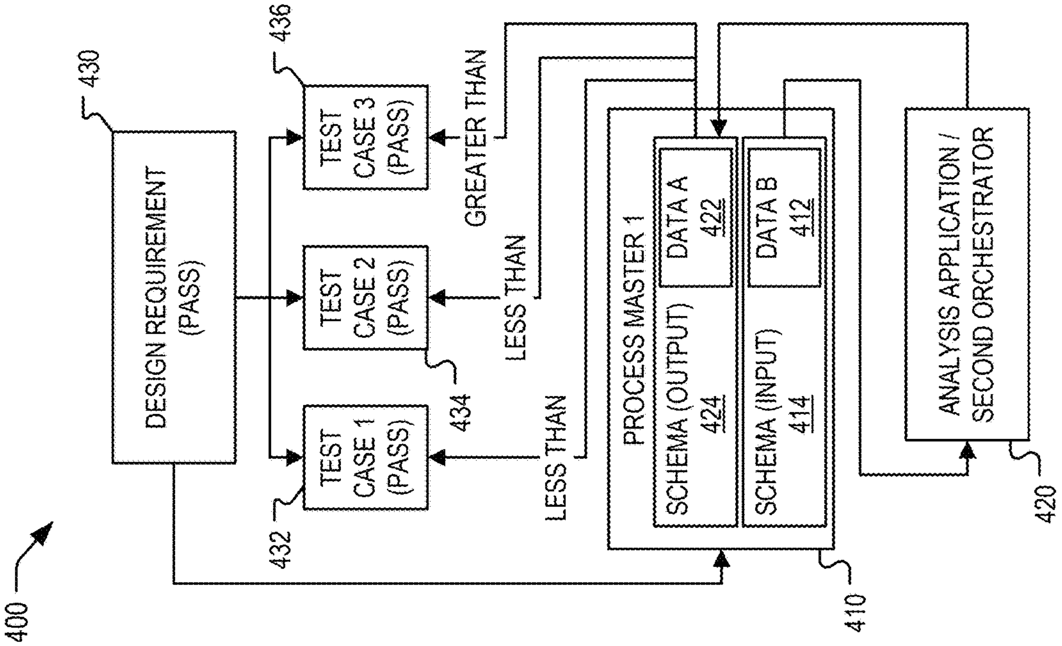
FIG. 4

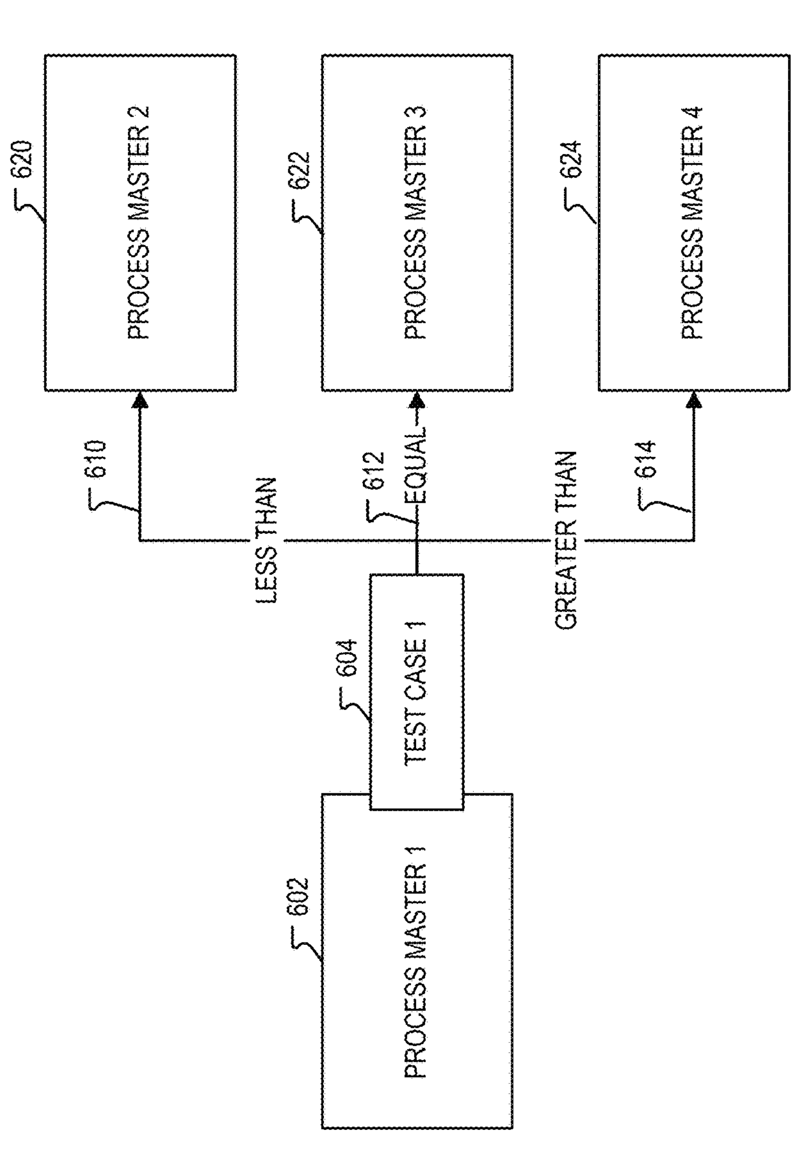
FIG. 6

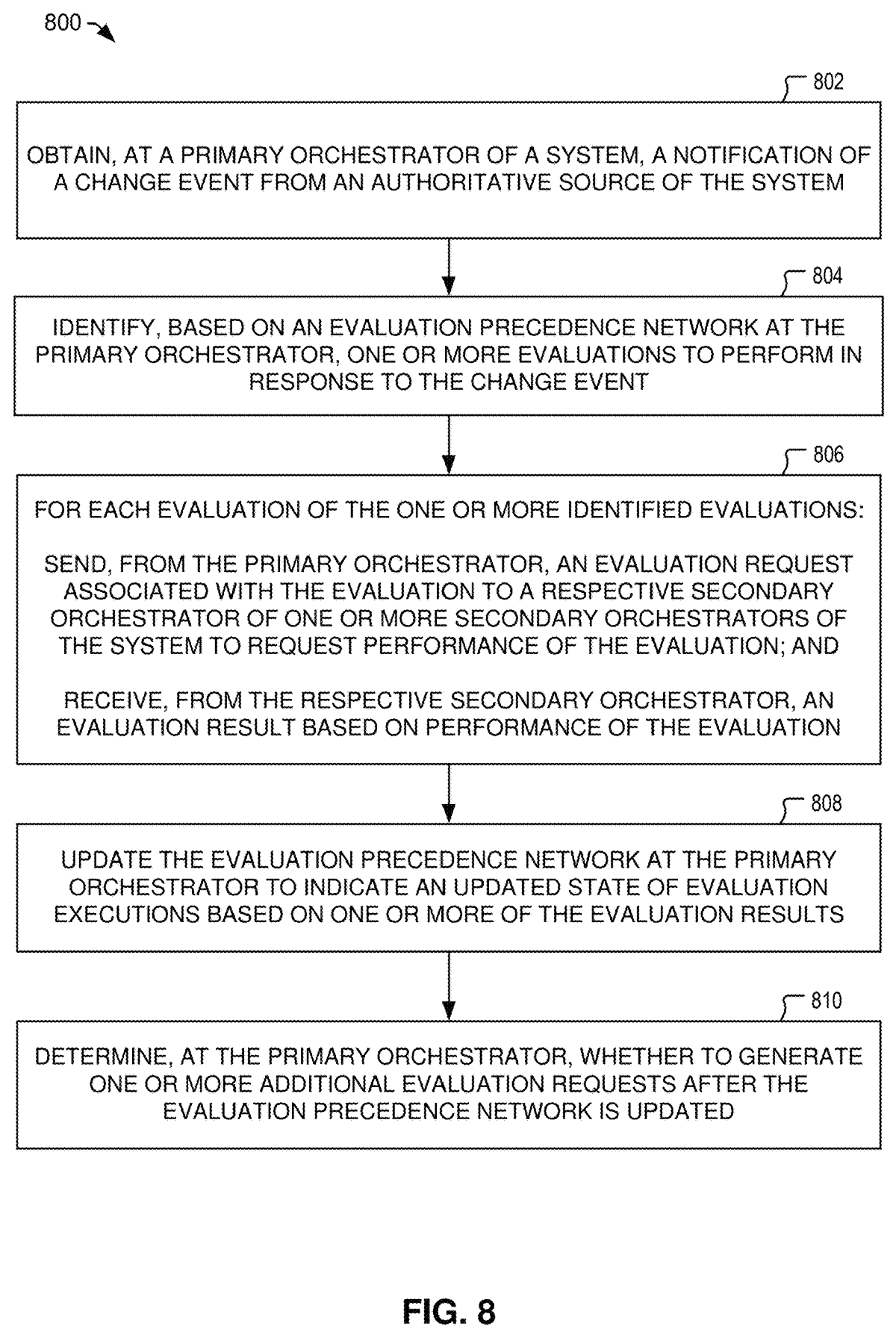

800

802

OBTAIN, AT A PRIMARY ORCHESTRATOR OF A SYSTEM, A NOTIFICATION OF A CHANGE EVENT FROM AN AUTHORITATIVE SOURCE OF THE SYSTEM

804

IDENTIFY, BASED ON AN EVALUATION PRECEDENCE NETWORK AT THE PRIMARY ORCHESTRATOR, ONE OR MORE EVALUATIONS TO PERFORM IN RESPONSE TO THE CHANGE EVENT

806

FOR EACH EVALUATION OF THE ONE OR MORE IDENTIFIED EVALUATIONS:

SEND, FROM THE PRIMARY ORCHESTRATOR, AN EVALUATION REQUEST ASSOCIATED WITH THE EVALUATION TO A RESPECTIVE SECONDARY ORCHESTRATOR OF ONE OR MORE SECONDARY ORCHESTRATORS OF THE SYSTEM TO REQUEST PERFORMANCE OF THE EVALUATION; AND

RECEIVE, FROM THE RESPECTIVE SECONDARY ORCHESTRATOR, AN EVALUATION RESULT BASED ON PERFORMANCE OF THE EVALUATION

808

UPDATE THE EVALUATION PRECEDENCE NETWORK AT THE PRIMARY ORCHESTRATOR TO INDICATE AN UPDATED STATE OF EVALUATION EXECUTIONS BASED ON ONE OR MORE OF THE EVALUATION RESULTS

810

DETERMINE, AT THE PRIMARY ORCHESTRATOR, WHETHER TO GENERATE ONE OR MORE ADDITIONAL EVALUATION REQUESTS AFTER THE EVALUATION PRECEDENCE NETWORK IS UPDATED

FIG. 8

PRIMARY ORCHESTRATOR FOR CONTINUOUS INTEGRATION SYSTEM

FIELD OF THE DISCLOSURE

The present disclosure is generally related to applying continuous integration to large scale, complex systems.

BACKGROUND

As the demands of engineering systems increase, an increasing amount of complexity is needed to integrate the layers of technology, enable data interoperability, maintain configuration control, and ensure quality in design. Design processes are increasingly challenged in identifying and understanding problems in a timely manner and before substantial impacts to program performance. This can be attributed to an increase in complexity, addition of new technology, shifting landscape of architecture, and a systemic understanding of the interplay between domains and how data change may impact cross-domains.

Continuous integration is a development practice that enables frequent integration of changes to a system. Conventional solutions for continuous integration are designed for software engineering workflows and tools, which predominantly focus on text-based, computer readable, and compilable and/or executable artifacts, making it harder for other engineering domains that require specific domain knowledge input, engineering analysis, etc., to adopt continuous integration practices. Traditional continuous integration servers are designed for simpler evaluation environments that do not require reconfiguration of physical resources or other more complex orchestration activities, and the actions triggered by traditional continuous integration servers are typically limited to what is defined by a human and do not have the ability to take autonomous action to further accelerate defect discovery and reduce engineering workload. In addition, many conventionally available tools do not allow for task control flows that have circular dependencies.

An improved system to provide continuous integration into large scale, complex systems with various evaluation environments would enable enhanced operation and efficiency of integrating changes in such systems.

SUMMARY

One aspect of the subject matter disclosed in detail below is a device that includes one or more processors configured to obtain, at a primary orchestrator of a system, a notification of a change event from an authoritative source of the system. The one or more processors are configured to identify, based on an evaluation precedence network at the primary orchestrator, one or more evaluations to perform in response to the change event. For each evaluation of the one or more identified evaluations, the one or more processors are configured to send, from the primary orchestrator, an evaluation request associated with the evaluation to a respective secondary orchestrator of one or more secondary orchestrators of the system to request performance of the evaluation, and receive, from the respective secondary orchestrator, an evaluation result based on performance of the evaluation. The one or more processors are configured to update the evaluation precedence network at the primary orchestrator to indicate an updated state of evaluation executions based on one or more of the evaluation results. The one or more processors are also configured to determine, at the primary orchestrator, whether to generate one or more additional evaluation requests after the evaluation precedence network is updated.

Another aspect of the subject matter disclosed in detail below is a method that includes obtaining, at a primary orchestrator of a system, a notification of a change event from an authoritative source of the system. The method includes identifying, based on an evaluation precedence network at the primary orchestrator, one or more evaluations to perform in response to the change event. The method includes, for each evaluation of the one or more identified evaluations, sending, from the primary orchestrator, an evaluation request associated with the evaluation to a respective secondary orchestrator of one or more secondary orchestrators of the system to request performance of the evaluation, and receiving, from the respective secondary orchestrator, an evaluation result based on performance of the evaluation. The method includes updating the evaluation precedence network at the primary orchestrator to indicate an updated state of evaluation executions based on one or more of the evaluation results. The method also includes determining, at the primary orchestrator, whether to generate one or more additional evaluation requests after the evaluation precedence network is updated.

Another aspect of the subject matter disclosed in detail below is a non-transitory computer-readable medium that includes instructions that, when executed by one or more processors, cause the one or more processors to perform operations including obtaining, at a primary orchestrator of a system, a notification of a change event from an authoritative source of the system and identifying, based on an evaluation precedence network at the primary orchestrator, one or more evaluations to perform in response to the change event. The operations include, for each evaluation of the one or more identified evaluations, sending, from the primary orchestrator, an evaluation request associated with the evaluation to a respective secondary orchestrator of one or more secondary orchestrators of the system to request performance of the evaluation, and receiving, from the respective secondary orchestrator, an evaluation result based on performance of the evaluation. The operations include updating the evaluation precedence network at the primary orchestrator to indicate an updated state of evaluation executions based on one or more of the evaluation results. The operations also include determining, at the primary orchestrator, whether to generate one or more additional evaluation requests after the evaluation precedence network is updated.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 3 is a diagram of components and operations that may be implemented in the system of FIG. 1, in accordance with some examples of the present disclosure.

FIG. 4 is a diagram of components and operations that may be implemented in the system of FIG. 1, in accordance with some examples of the present disclosure.

FIG. 6 is a diagram of components and operations that may be implemented in the system of FIG. 1, in accordance with some examples of the present disclosure.

FIG. 8 is a flowchart illustrating an example of a method of operating a primary orchestrator in the system of FIG. 1.

DETAILED DESCRIPTION

Figure 1:
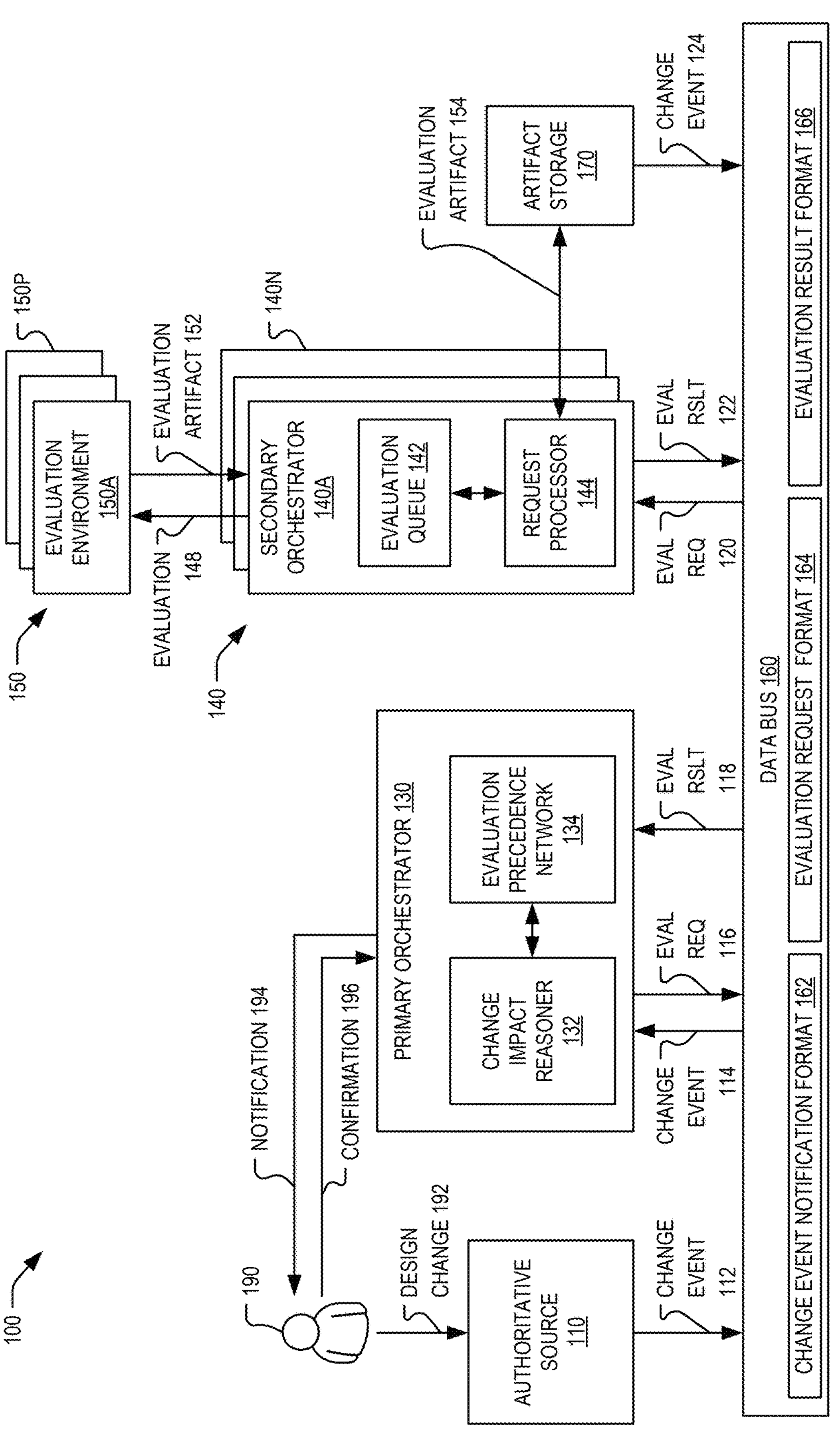
FIG. 1 is a diagram that illustrates a system that includes a primary orchestrator and one or more secondary orchestrators, in accordance with some examples of the present disclosure.

Aspects disclosed herein present systems and methods for using a primary orchestrator in a continuous integration system. Conventional techniques for continuous integration are designed for software engineering workflows and tools, and are not easily applicable to engineering domains that require specific domain knowledge input and engineering analysis to adopt continuous integration practices. Traditional continuous integration servers are designed for relatively less complex evaluation environments that do not require reconfiguration of physical resources or other more complex orchestration activities, and traditional continuous integration servers typically are unable to take autonomous action to accelerate defect discovery and reduce engineering workload. These drawbacks make it difficult to apply continuous integration to large scale, complex systems that involve multiple engineering disciplines and use of complex evaluation environments. These drawbacks also limit the benefits of continuous integration since such systems would only evaluate what has been defined by a human, and may not recognize higher order cause-and-effect patterns.

Some continuous integration systems have incorporated a directed acyclic graph (DAG) to represent tasks and dependencies between the tasks. A DAG can help speed up the continuous integration process by allowing tasks to start running as soon as their dependent task finish, even if other tasks in the previous stage of the process are still running. While such systems allow for more complex task sequences, such systems still suffer from the above drawbacks and do not allow for task control flows that have circular dependencies.

The present disclosure addresses the problems of providing continuous integration to cross-domain and complex engineering systems by introducing techniques to manage processes and enable quick responses to changes, flexibility in process architecture, and an evolutionary approach to respond to systematic effects.

In accordance with the disclosed techniques, a scalable and flexible orchestration method includes managing processes through hierarchical layers of abstraction, a decoupling of process and data, continuous integration of virtual and physical environments, distributed authority systems, and feedback loops from lower level tiers to improve higher level tier processes. The disclosed techniques include use of a primary orchestrator that coordinates the execution of evaluations across multiple different types of environments and decision logic about how to best respond to a change. Further, a standardized change event shared via a common databus is used to allow for various different types of authoritative sources to trigger a system response.

The disclosed systems and methods provide a holistic overview of the use of a primary orchestrator in a continuous integration system. As a result, the disclosed systems and methods enable management and distribution of complexity while being explicit about the impact of changes, the reasoning involved, and a providence of the decisions made.

The use of a primary orchestrator in conjunction with one or more secondary orchestrators in accordance with the present techniques enables improvements over conventional continuous integration systems, such as management of processes through hierarchical layers of abstraction, decoupling of process and data, continuous integration of virtual and physical environments, distributed authority systems, and feedback loops from lower tiers to improve higher level-tier processes. Such improvements provide the benefit of a development process for complex systems that exposes issues early and reduces engineering effort, thereby leading to higher quality, compliant products for less cost.

Specific examples are illustrated in the figures and the following description. All of the figures are covered by the present solution with features common across the various figures. The figures include multiple examples of different types of systems, devices, and operations that are possible in conjunction with the present solution. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular examples are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple evaluation environments are illustrated and associated with reference numbers 150A and 150P. When referring to a particular one of these usage metric generators, such as the evaluation environment 150A, the distinguishing letter "A" is used. However, when referring to any arbitrary one of these evaluation environments or to these evaluation environments as a group, the reference number 150 is used without a distinguishing letter.

Figure 9:
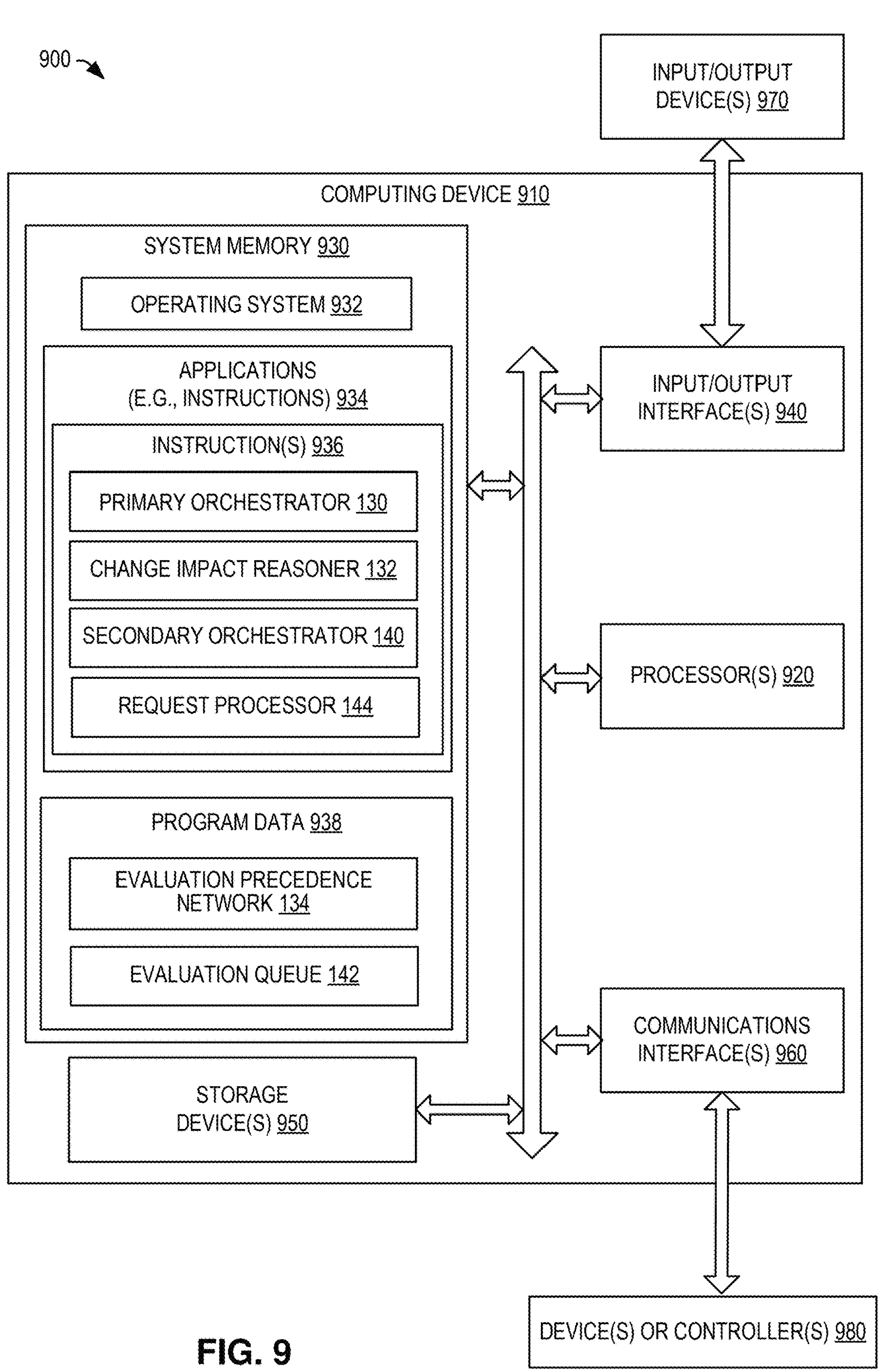
FIG. 9 is a block diagram of a computing environment including a computing device configured to support aspects of computer-implemented methods and computer-executable program instructions (or code) according to the present disclosure.

As used herein, various terminology is used for the purpose of describing particular examples and is not intended to be limiting. For example, the singular forms "a," "an," and "the" are intended to include the plural forms as well, unless the context clearly indicates otherwise. Further, some features described herein can be singular or plural. To illustrate, FIG. 9 depicts a device including one or more processors ("processor(s)" 920 in FIG. 9), which indicates that the device may include a single processor 920 or may include multiple processors 920. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "obtaining," "generating," "calculating," "using," "selecting," "accessing," and "determining" are interchangeable unless context indicates otherwise. For example, "obtaining," "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, a device that is "configured to" perform an operation includes dedicated circuitry, hardware, or other components that enable the operation to be performed by the device. As an example, programming of a general purpose processor with instructions that, when executed by the processor, cause the processor to perform a particular operation results in a special-purpose processor that is configured to perform that particular operation. A device can be configured to perform multiple operations. A device that is configured to perform an operation does not necessarily exclude the device from being configured to perform other operations.

As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a system 100 is illustrated including components associated with performance of continuous integration across multiple domains. The system 100 includes an authoritative source 110, a primary orchestrator 130, one or more secondary orchestrators 140, and an artifact storage 170 that are each communicatively coupled to a data bus 160.

The authoritative source 110 is configured to generate a notification of a change event 112 in response to detecting a change, such as a design change 192 from a user 190. As an illustrative example, the authoritative source 110 can correspond to a version control system, such as GIT-type version control system (e.g., GITLAB) (GIT is a trademark of Software Freedom Conservancy, Inc., Brooklyn, New York; GITLAB is a trademark of GITLAB BV, Amsterdam, Netherlands). However, the authoritative source 110 need not be a GIT-type version control system and can be another type of authoritative source, such as a repository of flight sensor data collected from aircraft sensors during a test flight (e.g., in the artifact storage 170), as an illustrative, non-limiting example.

In the illustrated example, the change event 112 corresponds to the design change 192 by the user 190. However, in other examples, the change event 112 can correspond to one or more other change events, such as a requirements change, or other change in the authoritative source 110.

The data bus 160 is configured to convey messages and data between various components of the system 100 using standardized messaging and data formats to enable interoperability and to facilitate the addition and/or substitution of components of the system 100. As an example, the primary orchestrator 130 can receive multiple change event notifications, including the notification of the change event 114, via the data bus 160, and each change event notification has a common change event notification format 162. As another example, the data bus 160 is configured to convey one or more evaluation requests and corresponding evaluation results between the primary orchestrator 130 and each of the one or more secondary orchestrators 140 using standardized formats. To illustrate, the primary orchestrator 130 is configured to generate each evaluation request according to a common evaluation request format 164, and each of the evaluation results conveyed on the data bus 160 has a common evaluation result format 166. The data bus 160 can correspond to an enterprise service bus (ESB) or APACHE KAFKA-type bus, as illustrative, non-limiting examples (APACHE and KAFKA are registered trademarks of The Apache Software Foundation, Delaware, USA). According to an aspect, the data bus 160 is implemented over one or more wireless networks, one or more wired networks, or a combination thereof.

The primary orchestrator 130 is configured to obtain, via the data bus 160, a change event notification that indicates a change to be integrated into the system 100. For example, the primary orchestrator 130 receives a notification of a change event 114 that corresponds to the change event 112 from the authoritative source 110, such as indicating the design change 192.

The primary orchestrator 130 includes a change impact reasoner 132 and an evaluation precedence network 134. The change impact reasoner 132 is configured to access the impact of a data change given a specific context and determine what other processes may need to be executed, re-executed, or transmitted to one or more secondary orchestrator 140 of another domain. According to an aspect, the change impact reasoner 132 is configured to assess an impact of a change event, such as the change event 114, based on a state of the evaluation precedence network 134 and determine one or more evaluations to be performed in conjunction with the change event. After one or more evaluations have been performed and the state of the evaluation precedence network 134 has been updated in response to the respective evaluation results, the change impact reasoner 132 can assess the impact of the change event based on the updated state of the evaluation precedence network 134 and perform a determination of whether to generate one or more additional evaluation requests based on the assessed impact. According to a particular aspect, the change impact reasoner 132 can include one or more processes that are executed to implement logic regarding interdependencies across the various domains of the system 100 as part of the impact assessment for a particular change. Such logic can be explicitly programmed into the change impact reasoner 132, such as by system architects or subject matter experts, learned by the change impact reasoner 132 based on a history of prior changes and their corresponding impacts (e.g., via training and/or updating of a machine learning model integrated in the change impact reasoner 132), or a combination thereof. According to an aspect, the change impact reasoner 132 is configured to evolve its ability to evaluate impacts of changes, such as to reason more deeply in response to a history of prior change events and their associated impacts.

The evaluation precedence network 134 includes one or more data structures or components to determine an execution order of processes or evaluations to be performed in response to a change event. In a particular example, the evaluation precedence network 134 includes a graph network data structure comprising multiple nodes and directional information (or "edges") indicating dependencies between nodes. The nodes can correspond to activities that can be performed. For example, each of the nodes can correspond to a particular procedure or evaluation that can be performed based on a particular change event, and the edges can be evaluated to schedule or determine an execution order of the procedures or evaluations. The evaluation precedence network 134 can incorporate information regarding various topics. As used herein, a "topic" can correspond to a grouping of events (or states) from multiple processes or applications and may include a context and interpretation of individual events to enable the primary orchestrator 130 to operate a higher level of abstraction when evaluating effects of changes in the system 100.

The primary orchestrator 130 is configured to identify, based on the evaluation precedence network 134, one or more evaluations to perform in response to the change event 114. For each evaluation of the one or more identified evaluations, the primary orchestrator 130 is configured to send an evaluation request associated with the evaluation to one or more respective secondary orchestrators of the secondary orchestrators 140 to request performance of the evaluation. In addition, for each of the identified evaluations, the primary orchestrator 130 is also configured to receive, from the respective secondary orchestrator, an evaluation result based on performance of the evaluation. As an example, upon receiving the change event 114, the change impact reasoner 132 determines one or more topics that can be affected by the change event 114 and identifies, via accessing the evaluation precedence network 134, a particular evaluation to be performed at a selected evaluation environment 150. The primary orchestrator 130 sends an evaluation request 116 via the data bus 160 to one or more particular secondary orchestrators 140 associated with the selected evaluation environment 150 to perform the identified evaluation, and may later receive, via the data bus 160, an evaluation result 118 indicating completion of the evaluation. According to an aspects, the evaluation request 116 indicates or corresponds to a set of one or more secondary orchestrators 140 that are notified of a change associated with a topic and provides a mechanism to initiate an orchestration of the secondary orchestrators 140.

The primary orchestrator 130 is also configured to update the evaluation precedence network 134 to indicate an updated state of evaluation executions based on one or more of the evaluation results 118. For example, the primary orchestrator 130 can update a state of a node in the evaluation precedence network 134 indicating that the evaluation associated with an evaluation result 118 has been completed and, according to some aspects, indicating an outcome of the evaluation.

The primary orchestrator 130 determines whether to generate one or more additional evaluation requests after the evaluation precedence network is updated. According to an aspect, the change impact reasoner 132 assess an impact of the change event 114 based on the updated state of the evaluation precedence network 134, and the determination of whether to generate the one or more additional evaluation requests is performed based on the assessed impact.

For example, when the updated evaluation precedence network 134 indicates that a particular evaluation is a dependency for one or more other evaluations, successful completion of the particular evaluation can cause the primary orchestrator 130 to schedule or request performance of the one or more of the other evaluations, which can result in generation of one or more additional evaluation requests 116. In some instances, such as when a particular evaluation is not successfully completed, the primary orchestrator 130 can instead schedule performance of one or more alternative processes or evaluations. According to some implementations, when multiple evaluation requests 116 are sent, the primary orchestrator 130 is configured to update the evaluation precedence network 134 to indicate the updated state after all of the evaluation results 118 have been received, while in other implementations the primary orchestrator 130 is configured to update the evaluation precedence network 134 as each of the evaluation result 118 is received.

According to some implementations, the primary orchestrator 130 is configured to generate an update notification 194 that indicates the updated state of the evaluation precedence network 134 and receive a confirmation 196 to continue responsive to the update notification 194. For example, a completed evaluation can correspond to a process that invokes a manual intervention, such as a review by the user 190 (or another user of the system 100), such as to obtain a review by a human subject matter expert that applies relevant engineering expertise to confirm that the evaluation results are satisfactory before initiating subsequent evaluations. In such implementations, the determination of whether to generate the one or more additional evaluation requests is at least partially based on receipt of the confirmation 196.

The secondary orchestrators 140 include a first secondary orchestrator 140A and one or more additional secondary orchestrators, including an $N^{th}$ secondary orchestrator 140N, where N is an integer greater than one. Each of the secondary orchestrators 140 is coupled to one or more respective evaluation environments 150 of a set of evaluation environments 150 and is communicatively coupled to the primary orchestrator 130 via the data bus 160. The secondary orchestrators 140 are each configured to orchestrate performance of requested evaluations at appropriate evaluation environments 150 and, according to some aspects, can manage a mixture of virtual and/or physical environments.

To illustrate, the evaluation environments 150 include a first evaluation environment 150A and one or more additional evaluation environments 150, including a $P^{th}$ evaluation environment 150P, where P is a positive integer greater than one and can be greater than, less than, or equal to N. Each of the evaluation environments 150 can correspond to a particular domain of multiple domains of the system 100 and is configured to evaluate effects of integrating changes in the system 100. For example, in an aerospace implementation, one or more of the evaluation environments 150 can correspond to a simulation environment (e.g., to develop a simulation that reflects the dynamics of an aircraft and incorporates changes to control laws associated with a flight control update that is indicated by the change event 114), a lab test environment (e.g., to test the performance predicted by the simulation using actual hardware and software associated with the aircraft), and a flight test environment (e.g., to perform physical testing of an aircraft that implements the flight control update). The above examples are illustrative and non-limiting; in other examples, one or more other types of evaluation environments 150 (e.g., automated software testing, testing of electronics, communication systems, material and structural components, etc.) can be included in the system 100 instead of, or in addition to, the examples listed above. Further, although examples corresponding to aerospace implementations are presented herein, it should be understood that the present techniques are not limited to any particular industry or domain.

Each of the secondary orchestrators 140 is configured to send an evaluation 148, e.g., information corresponding to a particular received evaluation request 120, to one or more particular evaluation environment 150 of the one or more evaluation environments 150 that are coupled to that secondary orchestrator 140; to receive, from the particular evaluation environment 150, data associated with a completed evaluation; and send, based on the data associated with the completed evaluation, a corresponding evaluation result 122 to the primary orchestrator 130. For example, the secondary orchestrator 140A receives an evaluation request 120 (e.g., corresponding to the evaluation request 116) and sends an evaluation 148 to the evaluation environment 150A for performance of the evaluation requested in the evaluation request 120. Upon completion of the evaluation at the evaluation environment 150A, the secondary orchestrator 140A receives an evaluation artifact 152 that includes data associated with the completed evaluation. The secondary orchestrator 140A sends a corresponding evaluation result 122, via the data bus 160, to the primary orchestrator 130 based on the data included in the evaluation artifact 152. In an illustrative example, the evaluation artifact 152 includes a corpus of data generated in conjunction with performing the evaluation, such as identifiers of which secondary orchestrator 140 and evaluation environment 150 were associated with the evaluation 148, time and date information corresponding to a start time of the evaluation, an end time of the evaluation, and/or a duration of the evaluation, the files, data, instructions, etc., that were provided to the evaluation environment 150A for performance of the evaluation, files, data, tester notes, log files, simulation results, test results, and any other information generated during the evaluation, identifiers of personnel, systems, software, procedures, etc., that were utilized during performance of the evaluation, or a combination thereof.

According to an aspect, each of the secondary orchestrators 140 includes an evaluation queue 142 that is configured to store entries regarding requested evaluations, and a request processor 144 coupled to the evaluation queue 142. The request processor 144 is configured to add entries to the evaluation queue 142 based on received evaluation requests 120, remove entries from the evaluation queue 142 based on completed evaluations, and send data of the completed evaluations to an artifact storage, such as the artifact storage 170.

For example, upon receiving the evaluation artifact 152 indicating that the evaluation is completed from the evaluation environment 150A, the request processor 144 removes the entry for the completed evaluation from the evaluation queue 142, generates and sends the evaluation result 122 to the primary orchestrator 130 via the data bus 160, and sends an evaluation artifact 154 (e.g., including or corresponding to the evaluation artifact 152) to the artifact storage 170. The evaluation result 122 can include metadata associated with the evaluation, such as identifiers of the evaluation 148, the secondary orchestrator 140A, and the evaluation environment 150A, time and date information corresponding to the evaluation, the storage location of the evaluation artifact 154 (e.g., an identifier of the artifact storage 170), and an outcome of the evaluation (e.g., pass/fail), as an illustrative, non-limiting example.

The artifact storage 170 is configured to store evaluation artifacts received from the secondary orchestrators 140 and to make the stored evaluation artifacts accessible to authorized requestors, such as the primary orchestrator 130 or the user 190, as illustrative, non-limiting examples. Upon receiving an evaluation artifact (e.g., the evaluation artifact 154), the artifact storage 170 is configured to generate a change event 124 indicating the addition of the newly stored information, which can be provided to the primary orchestrator 130 via the data bus 160. For example, the change event 124 may be evaluated by change impact reasoner 132 at the primary orchestrator 130 to determine what effects, if any, the addition of the evaluation artifact 154 to the artifact storage 170 has upon any one or more other components of the system 100.

An illustrative, non-limiting example of operation of the system 100 from the perspective of a user is described in further detail with reference to FIG. 2, and examples of various operations and components that may be implemented in the system 100 are described with reference to FIGS. 3-7.

By including the primary orchestrator 130 to orchestrate performance of processes and evaluations at the secondary orchestrators 140, the system 100 enables identification and understanding of the impact of integrating changes across various domains, providing a means to manage and distribute complexity while providing explicit detail regarding the impact of the change, the reasoning involved, and the decisions made. Thus, the primary orchestrator 130 enables more complex sequencing of evaluations and provides the ability to reason about how to best respond to a change in a system-wide manner.

The interaction between the primary orchestrator 130 and the secondary orchestrators 140 enables hierarchical layers of abstraction to be used, with the primary orchestrator 130 operating at a higher layer of abstraction as compared to the secondary orchestrators 140, which can operate at lower layers of abstraction appropriate for the particular domain(s) of each of the secondary orchestrators 140. Thus, the secondary orchestrators 140 can reduce complexity for the primary orchestrator 130 by managing a specific domain and isolating the primary orchestrator 130 from complexity associated with the specific domain.

Although a two-tier hierarchy is illustrated, including the primary orchestrator 130 in the upper tier and the secondary orchestrators 140 in the lower tier, in other implementations additional tiers can be included, such as an intermediate tier of orchestrators that are orchestrated by the primary orchestrator 130 in the upper tier, and that in turn can orchestrate evaluations at one or more evaluation environments in a similar manner as the secondary orchestrators 140 orchestrate evaluations at the evaluation environments 150, in addition to orchestrating operation of the secondary orchestrators 140 in a similar manner as described by the primary orchestrator 130 orchestrating operations at the secondary orchestrators 140.

Although a single representative authoritative source 110 is illustrated, it should be understood that the system 100 can include any number of authoritative sources 110 that are configured to generate change events 112 indicating changes whose impacts are to be evaluated at the primary orchestrator 130. Similarly, although a single artifact storage 170 is illustrated, it should be understood that the system 100 can include any number of artifact storages 170.

Although in some examples each of the authoritative source 110, the primary orchestrator 130, the secondary orchestrators 140, and the artifact storage 170 are implemented in distinct devices, such as each implemented by a respective one or more dedicated computing device(s) (e.g., a computer, server, server farm, data center, etc.) via one or more processors of the device executing instructions to perform the operations and functionality described for the respective components of the system 100, in other examples the operation and functionality of two or more of the authoritative source 110, the primary orchestrator 130, the secondary orchestrators 140, or the artifact storage 170 can be implemented at a single dedicated computing device (e.g., a computer, server, etc.).

While in some examples one or more of the authoritative source 110, the primary orchestrator 130, the secondary orchestrators 140, and the artifact storage 170 are geographically separated from each other, in other examples all of the authoritative source 110, the primary orchestrator 130, the secondary orchestrators 140, and the artifact storage 170 are geographically separated from another. In still other examples, one or more of the authoritative source 110, the primary orchestrator 130, the secondary orchestrators 140, or the artifact storage 170 are not geographically distributed and may be co-located within a single device or group of devices (e.g., in a single a server farm, data center, etc.).

Figure 2:
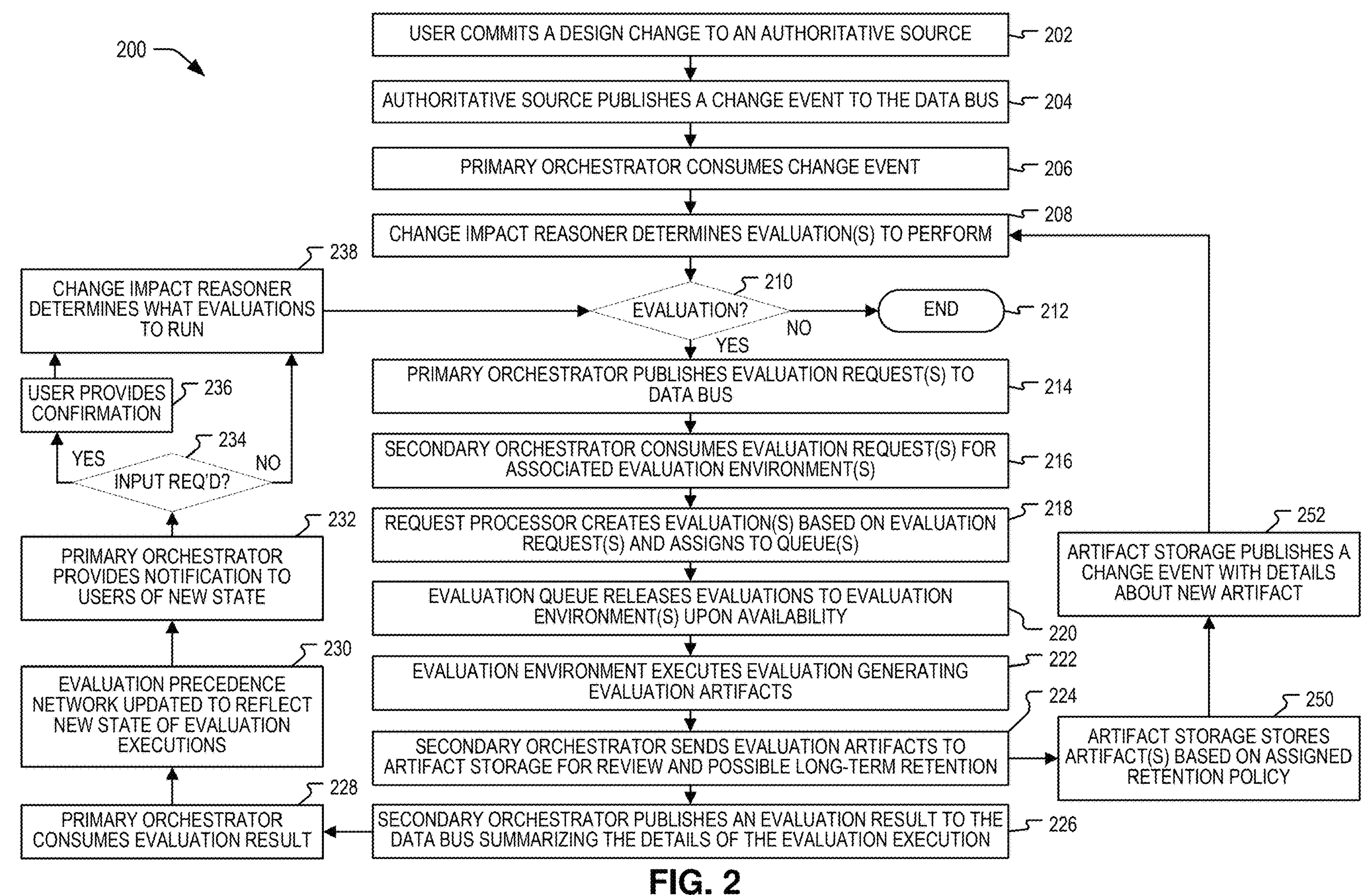
FIG. 2 is a diagram of operations that may be performed by the system of FIG. 1, in accordance with some examples of the present disclosure.

FIG. 2 is a diagram depicting examples of operations 200 that may be performed in the system 100 of FIG. 1, such as by the primary orchestrator 130, the secondary orchestrator(s) 140, the authoritative source 110, and the artifact storage 170, or a combination thereof. At block 202, a user commits a design change to an authoritative source for the user's design, such as the design change 192 to the authoritative source 110. At block 204, the authoritative source publishes a change event to the data bus, summarizing the design change. For example, the authoritative source 110 sends the change event 112, corresponding to the design change 192, to the data bus 160.

At block 206, the primary orchestrator consumes the change event, such as the primary orchestrator 130 receiving and processing the change event 114. At block 208, the change impact reasoner determines one or more evaluation(s) to perform in response to the design change, such as the processing of the change event 114 at the change impact reasoner 132.

At block 210, a determination is made as to whether an evaluation is to be performed. For example, if the primary orchestrator 130 determines, after processing the change event 114 at the change impact reasoner 132, that no evaluation is needed, the operations end, at block 212. Otherwise, at block 214, the primary orchestrator 130 publishes one or more evaluation requests to the data bus to request execution of one or more evaluations, such as the primary orchestrator 130 sending the evaluation request 116 to the data bus 160.

At block 216, one or more secondary orchestrators 140 consume the evaluation request(s) for one or more associated evaluation environments, such as the secondary orchestrator 140A consuming the evaluation request 120 for the evaluation environment 150A for which the secondary orchestrator 140A coordinates executions. At block 218, the request processor creates one or more evaluations based on the evaluation request(s) and assigns the created evaluations to one or more queues. For example, the request processor 144 of the secondary orchestrator 140A creates the evaluation 148 based on information in the evaluation request 120 and adds an entry for the evaluation 148 into the evaluation queue 142.

At block 220, the evaluation queue releases the evaluation(s) to the evaluation environment(s) upon availability. For example, the evaluation queue 142 sends the evaluation 148 to the evaluation environment 150A upon the evaluation environment 150A, based on the evaluation environment 150A, becoming available. At block 222, the evaluation environment executes the evaluation, generating evaluation artifacts, such as the evaluation environment 150A executing the evaluation 148 to generate the evaluation artifact 152.

At block 224, the secondary orchestrator sends the evaluation artifacts to an artifact storage for review and possible long-term retention. For example, the secondary orchestrator 140A sends the evaluation artifact 154 to the artifact storage 170. In addition, the secondary orchestrator can update its internal state to indicate completion of the evaluation, such as by updating one or more internal queues (e.g., the evaluation queue). At block 226, the secondary orchestrator publishes an evaluation result to the data bus summarizing the details of the evaluation execution. For example, the secondary orchestrator 140A sends the evaluation result 122 to the data bus 160.

Proceeding to block 228, the primary orchestrator consumes the evaluation result, such as the primary orchestrator 130 receiving and processing the evaluation result 118. At block 230, the evaluation precedence network is updated to reflect a new state of evaluation executions. For example, the evaluation precedence network 134 is updated based on the evaluation result 118 to have an updated state.

At block 232, the primary orchestrator provides a notification of the new state to one or more users, such as the notification 194 to the user 190. A determination is made as to whether human input is required, at block 234. If human input is required, processing proceeds to block 232, where the user provides a confirmation to continue, such as the confirmation 196 from the user 190. If human input is not required, or following receiving the confirmation, the change input reasoner determines what evaluations to run, at block 238. For example, the change impact reasoner 132 determines whether one or more additional evaluations are to be performed in response to the new state of the evaluation precedence network 134. Processing then returns to the determination, at block 210, as to whether any evaluations are to be performed.

Returning to block 224, after the secondary orchestrator sends the evaluation artifact(s) to the artifact storage, the artifact storage (e.g., the artifact storage 170) stores the evaluation artifact(s) (e.g., the evaluation artifact 154) based on an assigned retention policy, at block 250. At block 252, the artifact storage publishes a change event with details about the new artifact(s), such as the change event 124 sent by the artifact storage 170 to the data bus 160. After publishing the change event, processing returns to block 208, where the change impact reasoner determines whether the change event triggers additional evaluations to perform.

Therefore, processing can continue along multiple feedback paths until all evaluations have been performed for the initial change event 112, and also evaluations for all subsequently generated change events (e.g., the change event 124) that may arise as a result of processing and storage of results from the previous evaluations. As a result, the system 100 can perform evaluations according to task control flows that include circular dependencies.

FIG. 3 depicts an example of components and operations that can be performed in the system 100 of FIG. 1. A first diagram 300 illustrates a process that can be performed in an orchestrator, such as the primary orchestrator 130, when a new message 320 is received from a message queue, illustrated as a message bus 360 (e.g., the data bus 160). The message 320 is associated with a topic 310 from a downstream orchestrator (e.g., the secondary orchestrator 140A) and a corresponding topic wrapper 312. Receipt of the message 320 initiates the process, which includes four linked process masters (e.g., verification and validation (V&V) process masters, as illustrative, non-limiting examples)—a first process master 330, a second process master 332, a third process master 334, and a fourth process master 336 that executed based on completion of each of the process masters 330, 332, and 334. The first process master 330 and the second process master 332 correspond to auto-processes that do not involve human intervention, and the third process master 334 and the fourth process master 336 correspond to manual processes that require human intervention.

A second diagram 302 illustrates that, responsive to receiving the message 320, a new instance 340 of the first process is created with data 350 from the message 320, a new instance 342 of the second process is created with data 352 from the message 320, a new instance 344 of the third process is created with data 354 from the message 320, and a new instance 346 of the fourth process is created with data 356 from the message 320. According to some aspects, the data 350, 352, 354, 356 are all the same data; according to other aspects, one or more of the data 350, 352, 354, 356 is altered per the processing as defined within the associated master of which the respective instance is based on. A mechanism of a potential alteration is described in further detail with reference to FIG. 4. Each of the instances 340, 342, 344, and 346 maintains a connection to its corresponding process master 330, 332, 334, and 336, respectively, and also maintains a unique identifier that links all instances to be part of the same process execution thread.

The third process master 334 includes a control loop 370 in which a user review and processing is performed. As illustrated, a first version 344A of the instance 344 can be initiated, reviewed, and rejected by a user, and deleted, interrupting completion of the process. Also illustrated is a second version 344B of the instance 344 that is initiated, reviewed, and accepted by a user, enabling execution of the instance 346 of the fourth process. Execution results of the instance 346 of the fourth process can be reviewed by a user and, once approved 358, the resulting data 362 is designated as having a persist status 364.

FIG. 4 depicts examples of components and operations that can be implemented in the system 100 of FIG. 1. A first diagram 400 and a second diagram 402 illustrate components of a process "node" that can be implemented at the primary orchestrator 130. As illustrated, a process master 410 (e.g., a V&V process master, in an illustrative, non-limiting example) obtains data "B" 412 associated with an input schema 414 (e.g., configuration files and/or other data that is associated with process performance and that may outline the structure and relationships between different components of the process).

The data 412 is provided to an analysis application/second orchestrator 420. For example, the analysis application/second orchestrator 420 may correspond to an application or process executing at the primary orchestrator 130 or at one of the secondary orchestrators 140. The analysis application/second orchestrator 420 processes (e.g., analyses and/or performs an evaluation using) the data 412 and returns data "A" 422 of an output schema 424.

A first test case 432, a second test case 434, and a third test case 436 are each required to satisfy a design requirement 430 that is linked to the process master 410. For example, the first test case 432 may have a "pass" status when results of using the data 422 in the first test case 432 satisfy (e.g., are less than or equal to) first criteria indicated by the design requirement 430 and may have a "fail" status otherwise. The second test case 434 may have a "pass" status when results of using the data 422 in the second test case 434 satisfy (e.g., are less than or equal to) second criteria indicated by the design requirement 430 and may have a "fail" status otherwise. The third test case 436 may have a "pass" status when results of using the data 422 in the third test case 436 satisfy (e.g., are greater than or equal to) third criteria indicated by the design requirement 430 and may have a "fail" status otherwise.

As illustrated in the first diagram 400, each of the test cases 432, 434, 436 is performed and results in a "pass" status, resulting in satisfaction of the design requirement 430 and a "pass" status. In contrast, the second diagram 402 illustrates an example in which the third test case 436 fails, such as when the results of using the data 422 in the third test case 436 do not satisfy (e.g., are less than or equal to, and are not greater than) the third criteria. Because at least one of the test cases 432, 434, or 436 fails, the design requirement 430 is not satisfied, resulting in a "fail" status.

Figure 5:
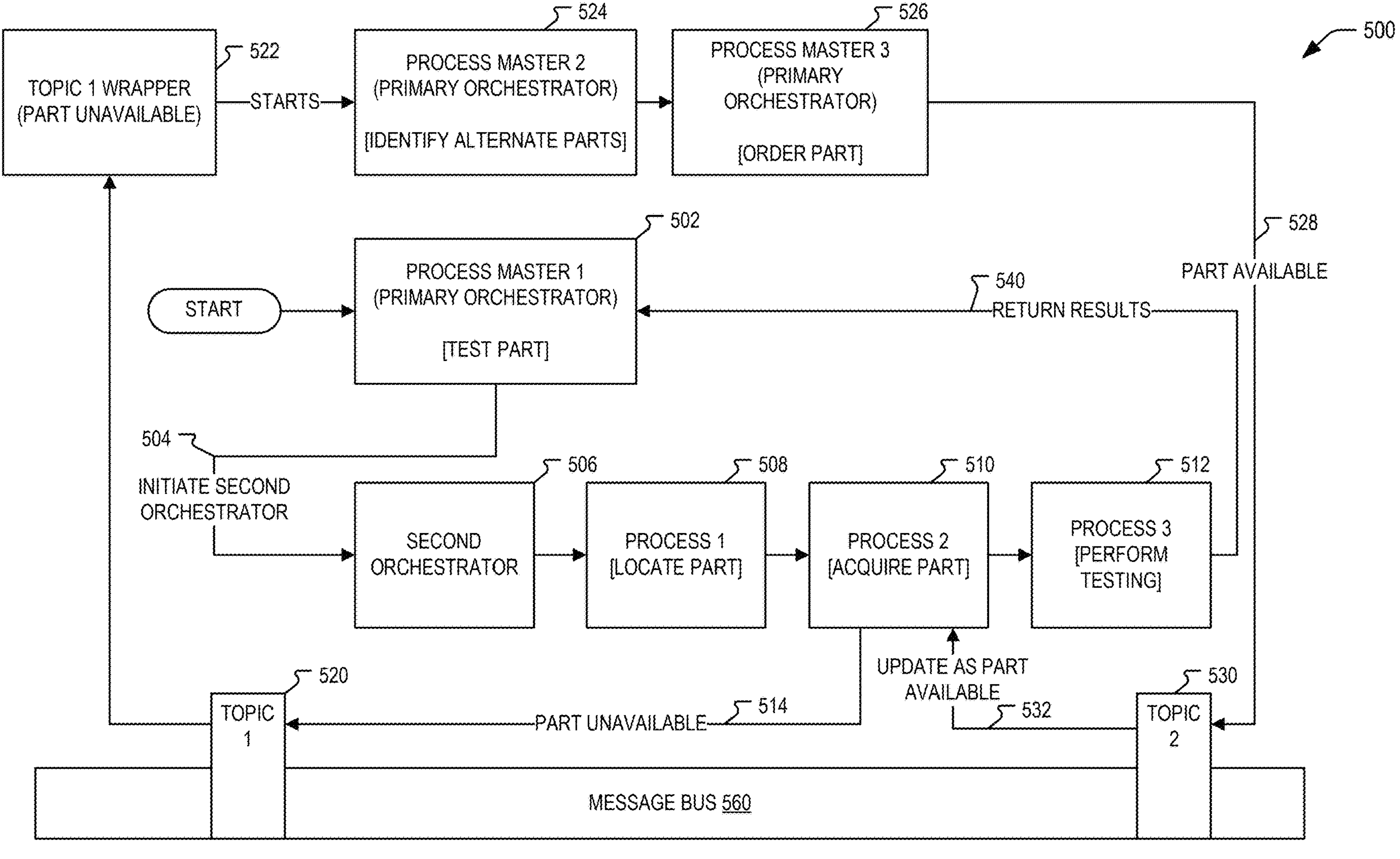
FIG. 5 is a diagram of components and operations that may be implemented in the system of FIG. 1, in accordance with some examples of the present disclosure.

FIG. 5 is a diagram depicting examples of components and operations that can be implemented in the system 100 of FIG. 1. In particular, a process 500 illustrates how a second orchestrator can be initiated from a primary orchestrator and how the second orchestrator can create a condition to initiate a state change in the primary orchestrator.

The process 500 starts with initiation of a first process master 502 (e.g., a V&V process master) at a primary orchestrator, such as the primary orchestrator 130, to test a part, such as a component of an aircraft. The first process master 502 sends a message 504 to initiate a second orchestrator 506, such as the secondary orchestrator 140A. After sending the message 504, the first process master 502 may "wait" for the second orchestrator 506 to resolve its process of work.

The second orchestrator 506 initiates a "test part" procedure that includes a first process 508 to locate the part, a second process 510 to acquire the part, and a third process 512 to perform testing on the part. However, during execution of the second process 510, a determination is made that the part is unavailable. In response, the second orchestrator 506 can broadcast or announce its current state (e.g., the part is unavailable), so that another process that has been defined to react to that state can be initiated. To illustrate, the second process 510 issues a message 514 indicating that the part is unavailable to a first topic 520 at a message bus 560 (e.g., the data bus 160), and a first topic wrapper 522 associated with the first topic 520 initiates a process at the primary orchestrator 130 to identify and order alternative parts. In an example, the first topic wrapper 522 corresponds to a structure that adds a layer of abstraction around the first topic 520 to enable compatibility and/or interoperability of the first topic 520 to a second process master 524 (e.g., a V&V process master).

The process initiated at the primary orchestrator includes the second process master 524 to identify alternative parts, and a third process master 526 (e.g., a V&V process master) to order one of the identified alternative parts. Upon the alternative part becoming available, the third process master 526 issues a message 528, indicating that the alternative part is available to a second topic 530 at the message bus 560. The second topic 530 issues a message 532 to cause an update to the state of the second process 510 by indicating that the alternative part is available. In response, processing resumes at the second orchestrator 506 to complete the second process 510 (acquire part) and the third process 512 (perform testing). Upon completion of the third process 512, results 542 of testing the alternative part are provided to the first process master 502 at the primary orchestrator.

FIG. 6 depicts an example 600 of components and operations that can be implemented in the system 100 of FIG. 1. In particular, the example 600 illustrates how a process, such as a V&V process, can use logic through a test case to automatically determine which process of multiple processes to execute.

As illustrated, a process master 602 can perform a test case 604 (e.g., corresponding to a design requirement, such as the design requirement 430 of FIG. 4) and compare results of the test case 604 to criteria associated with the test case 604. In response to the results of the test case 604 being less than the criteria, a first execution path 610 is followed that includes executing a second process master 612. In response to the results of the test case 604 matching (e.g., being equal to) the criteria, a second execution path 620 is followed that includes executing a third process master 622. In response to the results of the test case 604 being greater than the criteria, a third execution path 630 is followed that includes executing a fourth process master 632.

Figure 7:
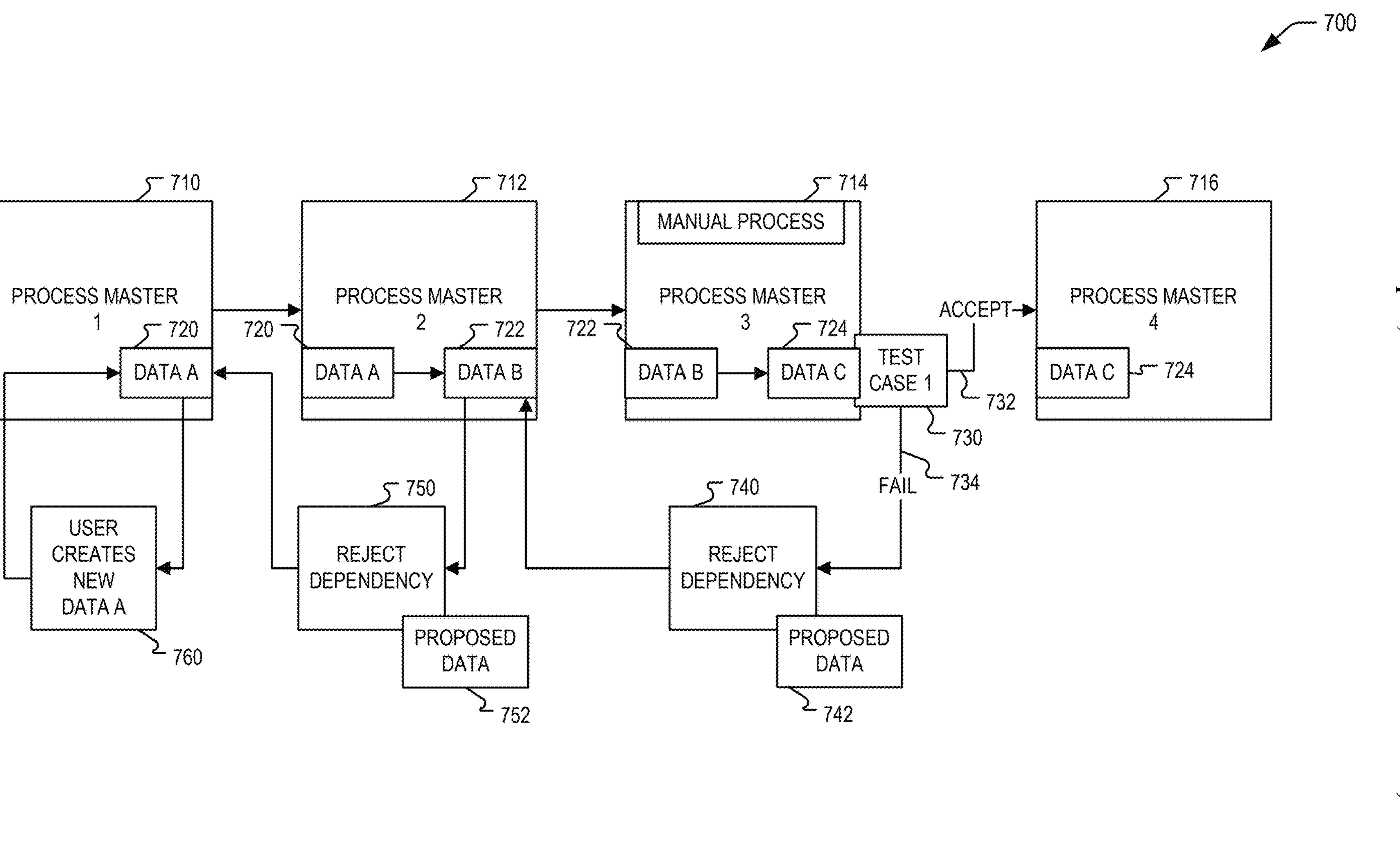
FIG. 7 is a diagram of components and operations that may be implemented in the system of FIG. 1, in accordance with some examples of the present disclosure.

FIG. 7 depicts an example 700 of components and operations that can be implemented in the system 100 of FIG. 1. In particular, the example 700 demonstrates how a dependent process can fail a test case and reject a data dependency.

As illustrated, a procedure includes sequential performance of a first process master 710, a second process master 712, a third process master 714, and a fourth process master 716. In an illustrative, non-limiting example, the process masters 710, 712, 714, 176 correspond to V&V process masters. The first process master 710 provides first data “A” 720 to the second process master 712. The second process master 712 receives the first data 720 and outputs second data “B” 722 to the third process master 714. The second data 722 can be generated based on the first data 720, either singularly or in conjunction with other input data (not shown). The third process master 714 is a manual process that receives the second data 722 and generates third data “C” 724 that is used in a test case 730. In the event the test case 730 is passed, the third data 724 is accepted and the procedure follows an execution path 732 in which the third data 724 is output to the fourth process master 716.

Alternatively, if the test case 730 fails and a user decides that the input data (e.g., the second data 722) cannot be resolved, a dependency rejection 740 is issued. In the illustrated example, the dependency rejection 740 includes or is associated with a new data proposal 742, such as a proposed new value of the second data 722. For example, the new data proposal 742 can be computed as an input value to the third process master 714 that would result in a value of the third data 724 that would pass the test case 730. The dependency rejection 740 and the new data proposal 742 are provided to the second process master 712.

Receipt of the dependency rejection 740 and the new data proposal 742 causes the second process master 712 to issue a dependency rejection 750. The dependency rejection 750 includes or is associated with a new data proposal 752, such as a proposed new value of the first data 720. For example, the new data proposal 752 may be computed as an input value to the second process master 712 that would result in a value of the second data 722 that matches the data proposal 742. The dependency rejection 750 and the new data proposal 752 are provided to the first process master 710.

Receipt of the dependency rejection 750 and the new data proposal 752 causes a user associated with the first process master 710, such as an owner of the process, to create a new value of the first data 720. For example, the user can elect to accept the data proposal 752 or to instead use a different value. The procedure is then repeated using the new value of the first data 720.

According to an aspect, one or more of the data proposals 742, 752 can be calculated using a sensitivity analysis. To illustrate, in a particular example the second process master 712 generates the second data 722 based on a function of multiple data inputs, such that $f(x, y, z)=n$, where x represents the first data 720, y and z represent additional input data received at the second process master 712 from other processes (not shown), f( ) represents a function associated with operations performed on the input data, and n represents the second data 722. A sensitivity analysis can be conducted to identify which one or more of the values x, y, and z change the value of n most dramatically, and the dependency rejection 750 can be directed to one or more of the processes that generated the identified values of x, y, and/or z.

FIG. 8 is a flowchart illustrating a method 800 of operating a primary orchestrator. In a particular implementation, the method 800 is performed by the primary orchestrator 130 of FIG. 1.

The method 800 includes, at block 802, obtaining, at a primary orchestrator of a system, a notification of a change event from an authoritative source of the system. For example, the primary orchestrator 130 receives the change event 114 notifying of the design change 192 at the authoritative source 110.

The method 800 includes, at block 804, identifying, based on an evaluation precedence network at the primary orchestrator, one or more evaluations to perform in response to the change event. For example, the primary orchestrator 130 determines, based on the evaluation precedence network 134, one or more evaluations to perform in response to receiving the change event 114.

The method 800 includes, at block 806, for each evaluation of the one or more identified evaluations: sending, from the primary orchestrator, an evaluation request associated with the evaluation to a respective secondary orchestrator of one or more secondary orchestrators of the system to request performance of the evaluation; and receiving, from the respective secondary orchestrator, an evaluation result based on performance of the evaluation. For example, the primary orchestrator 130 sends the evaluation request 116 to the secondary orchestrator 140A and receives the evaluation result 118 indicating a result of performing the evaluation 148 at the evaluation environment 150A.

The method 800 includes, at block 808, updating the evaluation precedence network at the primary orchestrator to indicate an updated state of evaluation executions based on one or more of the evaluation results. For example, the primary orchestrator 130 updates the evaluation precedence network 134 based on the evaluation result 118. According to some implementations, an updated state of the evaluation precedence network is determined upon receipt of each of the evaluation results, while in other implementations the method 800 includes updating the evaluation precedence network to indicate the updated state after all of the evaluation results have been received.

The method 800 includes, at block 810, determining, at the primary orchestrator, whether to generate one or more additional evaluation requests after the evaluation precedence network is updated. According to an aspect, the method 800 can also include assessing, at a change impact reasoner of the primary orchestrator, an impact of the change event based on the updated state of the evaluation precedence network, and performing the determination of whether to generate the one or more additional evaluation requests based on the assessed impact. For example, the primary orchestrator 130 can determine whether to generate additional evaluation requests based on the updated state of the evaluation precedence network 134, such as described with reference to the change impact reasoner 132.

According to an aspect, the method 800 includes generating an update notification that indicates the updated state, such as the notification 194, and receiving a confirmation to continue responsive to the update notification, such as the confirmation 196 from the user 190. The determination of whether to generate the one or more additional evaluation requests may be at least partially based on receipt of the confirmation.

According to an aspect, the method 800 includes conveying the one or more evaluation requests and the evaluation results between the primary orchestrator and each of the one or more secondary orchestrators via a data bus, such as the data bus 160. The method 800 can also include generating, at the primary orchestrator, each evaluation request according to a common evaluation request format, such as the evaluation request format 164. Similarly, each of the evaluation results conveyed on the data bus can have a common evaluation result format, such as the evaluation result format 166. The method 800 can include receiving, at the primary orchestrator, multiple change event notifications via the data bus (where the multiple change event notifications include the notification of the change event), and each change event notification of the multiple change event notifications has a common change event notification format, such as the change event notification format 162.

According to an aspect, the method 800 includes, at a secondary orchestrator of the one or more secondary orchestrators, sending information corresponding to a particular evaluation request to a particular evaluation environment, such as the secondary orchestrator 140A sending the evaluation 148 to the evaluation environment 150A. The secondary orchestrator receives, from the particular evaluation environment, data associated with a completed evaluation, such as the evaluation artifact 152, and the secondary orchestrator sends, based on the data associated with the completed evaluation, a corresponding evaluation result to the primary orchestrator, such as the evaluation result 122 sent by the secondary orchestrator 140A to the primary orchestrator 130.

The method 800 enables the primary orchestrator to orchestrate performance of processes and evaluations at the secondary orchestrators. Thus, the method 800 enables more complex sequencing of evaluations in a system and provides the ability to reason about how to best respond to a change in a system-wide manner. As a result, the impact of integrating changes across various domains can be more identified and verified more accurately and thoroughly as compared to conventional methods.

The method 800 also enables hierarchical layers of abstraction to be used according to the interactions between the primary orchestrator and the secondary orchestrators, with the primary orchestrator operating at a higher layer of abstraction than the secondary orchestrators, which can operate at lower levels of abstraction appropriate for the particular domain(s) of each of the secondary orchestrators. Thus, the method 800 enables reduced complexity for the primary orchestrator by distributing management of specific domains to the secondary orchestrators and isolating the primary orchestrator from complexity associated with the specific domains.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-8. In some implementations, the computing device 910 corresponds to the primary orchestrator 130, one or more secondary orchestrator 140, or a combination thereof.

The computing device 910 includes the one or more processors 920. The one or more processors 920 are configured to communicate with system memory 930, one or more storage devices 950, one or more input/output interfaces 940, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 938, such as data corresponding to the evaluation precedence network 134, data corresponding to the evaluation queue 142, or a combination thereof.

The system memory 930 includes one or more applications 934 (e.g., sets of instructions 936) executable by the one or more processors 920. As an example, the one or more applications 934 include instructions executable by the one or more processors 920 to initiate, control, or perform one or more operations described with reference to FIGS. 1-8. To illustrate, the one or more applications 934 include instructions executable by the one or more processors 920 to initiate, control, or perform one or more operations described with reference to the primary orchestrator 130, the change impact reasoner 132, a secondary orchestrator 140, the request processor 144, or a combination thereof.

The system memory 930 includes a non-transitory, computer readable medium storing the instructions that, when executed by the one or more processors 920, cause the one or more processors 920 to perform operations including obtaining, at a primary orchestrator of a system, a notification of a change event from an authoritative source of the system and identifying, based on an evaluation precedence network at the primary orchestrator, one or more evaluations to perform in response to the change event. The operations include, for each evaluation of the one or more identified evaluations, sending, from the primary orchestrator, an evaluation request associated with the evaluation to a respective secondary orchestrator of one or more secondary orchestrators of the system to request performance of the evaluation, and receiving, from the respective secondary orchestrator, an evaluation result based on performance of the evaluation. The operations include updating the evaluation precedence network at the primary orchestrator to indicate an updated state of evaluation executions based on one or more of the evaluation results. The operations also include determining, at the primary orchestrator, whether to generate one or more additional evaluation requests after the evaluation precedence network is updated.

The one or more storage devices 950 include nonvolatile storage devices, such as magnetic disks, optical disks, or flash memory devices. In a particular example, the storage devices 950 include both removable and non-removable memory devices. The storage devices 950 are configured to store an operating system, images of operating systems, applications (e.g., one or more of the applications 934), and program data (e.g., the program data 938). In a particular aspect, the system memory 930, the storage devices 950, or both, include tangible computer-readable media. In a particular aspect, one or more of the storage devices 950 are external to the computing device 910.

The one or more input/output interfaces 940 enable the computing device 910 to communicate with one or more input/output devices 970 to facilitate user interaction. For example, the one or more input/output interfaces 940 can include a display interface, an input interface, or both. For example, the input/output interface 940 is adapted to receive input from a user, to receive input from another computing device, or a combination thereof. The input/output interface 940 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). The input/output devices 970 may include one or more user interface devices and displays, including some combination of buttons, keyboards, pointing devices, displays, speakers, microphones, touch screens, and other devices. In a particular example, the input/output devices 970 may enable presentation of the notification 194 to a user and receipt of the confirmation 196 from the user.

The one or more processors 920 are configured to communicate with one or more devices (or controllers) 980 via the one or more communications interfaces 960. For example, the one or more communications interfaces 960 can include a network interface. The one or more devices 980 can include, for example, the data bus 160, the authoritative source 110, one or more of the secondary orchestrators 140, the artifact storage 170, or any combination thereof.

In conjunction with the described systems and methods, an apparatus is disclosed that includes means for obtaining, at a primary orchestrator of a system, a notification of a change event from an authoritative source of the system. For example, the means for obtaining the notification of a change event can correspond to the primary orchestrator 130, the change impact reasoner 132, the evaluation precedence network 134, the data bus 160, the computing device 910, the communications interface(s) 960, the processor(s) 920 executing the instructions 936 to perform one or more operations corresponding to the primary orchestrator 130 obtaining a notification of a change event from an authoritative source, one or more other circuits or devices configured to obtain, at a primary orchestrator of a system, a notification of a change event from an authoritative source of the system, or a combination thereof.

The apparatus includes means for identifying, based on an evaluation precedence network at the primary orchestrator, one or more evaluations to perform in response to the change event. For example, the means for identifying the one or more evaluations to perform in response to the change event can correspond to the primary orchestrator 130, the change impact reasoner 132, the evaluation precedence network 134, the computing device 910, the processor(s) 920 executing the instructions 936 to perform one or more operations corresponding to the primary orchestrator 130 identifying the one or more evaluations to perform in response to the change event, the instructions 936 of the change impact reasoner 132 executed by the processor(s) 920, one or more other circuits or devices configured to identify, based on an evaluation precedence network at the primary orchestrator, one or more evaluations to perform in response to the change event or a combination thereof.

The apparatus includes means, for each evaluation of the one or more identified evaluations, for sending, from the primary orchestrator, an evaluation request associated with the evaluation to a respective secondary orchestrator of one or more secondary orchestrators of the system to request performance of the evaluation, and for receiving, from the respective secondary orchestrator, an evaluation result based on performance of the evaluation. For example, the means for sending the evaluation requests and receiving the evaluation results can correspond to the primary orchestrator 130, the change impact reasoner 132, the evaluation precedence network 134, the data bus 160, the computing device 910, the communications interface(s) 960, the processor(s) 920 executing the instructions 936 to perform one or more operations corresponding to the primary orchestrator 130 sending the evaluation requests and receiving the evaluation results, one or more other circuits or devices configured to, for each evaluation of the one or more identified evaluations, send, from the primary orchestrator, an evaluation request associated with the evaluation to a respective secondary orchestrator of one or more secondary orchestrators of the system to request performance of the evaluation and to receive, from the respective secondary orchestrator, an evaluation result based on performance of the evaluation, or a combination thereof.

The apparatus includes means for updating the evaluation precedence network at the primary orchestrator to indicate an updated state of evaluation executions based on one or more of the evaluation results. For example, the means for updating the evaluation precedence network at the primary orchestrator to indicate an updated state of evaluation executions based on one or more of the evaluation results can correspond to the primary orchestrator 130, the change impact reasoner 132, the evaluation precedence network 134, the computing device 910, the processor(s) 920 executing the instructions 936 to perform one or more operations corresponding to the primary orchestrator 130 updating the evaluation precedence network to indicate an updated state of evaluation executions based on one or more of the evaluation results, the instructions 936 of the change impact reasoner 132 executed by the processor(s) 920, one or more other circuits or devices configured to update the evaluation precedence network at the primary orchestrator to indicate an updated state of evaluation executions based on one or more of the evaluation results, or a combination thereof.

The apparatus also includes means for determining, at the primary orchestrator, whether to generate one or more additional evaluation requests after the evaluation precedence network is updated. For example, the means for determining whether to generate one or more additional evaluation requests after the evaluation precedence network is updated can correspond to the primary orchestrator 130, the change impact reasoner 132, the evaluation precedence network 134, the computing device 910, the processor(s) 920 executing the instructions 936 to perform one or more operations corresponding to the primary orchestrator 130 determining whether to generate one or more additional evaluation requests after the evaluation precedence network is updated, the instructions 936 of the change impact reasoner 132 executed by the processor(s) 920, one or more other circuits or devices configured to determine, at the primary orchestrator, whether to generate one or more additional evaluation requests after the evaluation precedence network is updated, or a combination thereof.

A non-transitory, computer readable medium can store instructions that, when executed by one or more processors, cause the one or more processors to initiate, perform, or control operations to perform part or all of the functionality described above. For example, the instructions may be executable to implement one or more of the operations or methods of FIGS. 1-9. Part or all of one or more of the operations or methods of FIGS. 1-9 may be implemented by one or more processors (e.g., one or more central processing units (CPUs), one or more graphics processing units (GPUs), one or more neural processing units (NPUs), one or more digital signal processors (DSPs)) executing instructions, by dedicated hardware circuitry, or any combination thereof.

Particular aspects of the disclosure are described below in a first set of interrelated Examples:

According to Example 1, a device includes one or more processors configured to obtain, at a primary orchestrator of a system, a notification of a change event from an authoritative source of the system; and identify, based on an evaluation precedence network at the primary orchestrator, one or more evaluations to perform in response to the change event. The one or more processors are configured to, for each evaluation of the one or more identified evaluations: send, from the primary orchestrator, an evaluation request associated with the evaluation to a respective secondary orchestrator of one or more secondary orchestrators of the system to request performance of the evaluation; and receive, from the respective secondary orchestrator, an evaluation result based on performance of the evaluation. The one or more processors are also configured to: update the evaluation precedence network at the primary orchestrator to indicate an updated state of evaluation executions based on one or more of the evaluation results; and determine, at the primary orchestrator, whether to generate one or more additional evaluation requests after the evaluation precedence network is updated.

Example 2 includes the device of Example 1, wherein the one or more processors are configured to generate an update notification that indicates the updated state; and receive a confirmation to continue responsive to the update notification, wherein the determination of whether to generate the one or more additional evaluation requests is at least partially based on receipt of the confirmation.

Example 3 includes the device of Example 1 or Example 2, wherein the one or more processors are configured to update the evaluation precedence network to indicate the updated state after all of the evaluation results have been received.

Example 4 includes the device of any of Examples 1 to 3, wherein the primary orchestrator includes a change impact reasoner that is configured to assess an impact of the change event based on the updated state of the evaluation precedence network; and perform the determination of whether to generate the one or more additional evaluation requests based on the assessed impact.

Example 5 includes the device of Example 4, wherein the evaluation precedence network includes a graph network data structure comprising multiple nodes.

Example 6 includes the device of any of Examples 1 to 5, wherein each of the one or more secondary orchestrators are communicatively coupled to the primary orchestrator via a data bus, and wherein the data bus is configured to convey the evaluation requests and the evaluation results between the primary orchestrator and each of the one or more secondary orchestrators.

Example 7 includes the device of Example 6, wherein the primary orchestrator is configured to generate each evaluation request according to a common evaluation request format, and wherein each of the evaluation results conveyed on the data bus has a common evaluation result format.

Example 8 includes the device of Example 6 or Example 7, wherein the primary orchestrator is configured to receive multiple change event notifications via the data bus, wherein the multiple change event notifications include the notification of the change event, and wherein each change event notification of the multiple change event notifications has a common change event notification format.

Example 9 includes the device of any of Examples 1 to 8, wherein each of the one or more secondary orchestrators is coupled to one or more respective evaluation environments and is configured to send information corresponding to a particular evaluation request to a particular evaluation environment of the one or more respective evaluation environments; receive, from the particular evaluation environment, data associated with a completed evaluation; and send, based on the data associated with the completed evaluation, a corresponding evaluation result to the primary orchestrator.

Example 10 includes the device of Example 9, wherein each of the one or more secondary orchestrators includes: an evaluation queue configured to store entries regarding requested evaluations; and a request processor configured to add entries to the evaluation queue based on received evaluation requests; remove entries from the evaluation queue based on completed evaluations; and send data of the completed evaluations to an artifact storage.

According to Example 11, a method includes obtaining, at a primary orchestrator of a system, a notification of a change event from an authoritative source of the system; and identifying, based on an evaluation precedence network at the primary orchestrator, one or more evaluations to perform in response to the change event. The method includes, for each evaluation of the one or more identified evaluations: sending, from the primary orchestrator, an evaluation request associated with the evaluation to a respective secondary orchestrator of one or more secondary orchestrators of the system to request performance of the evaluation; and receiving, from the respective secondary orchestrator, an evaluation result based on performance of the evaluation. The method also includes updating the evaluation precedence network at the primary orchestrator to indicate an updated state of evaluation executions based on one or more of the evaluation results; and determining, at the primary orchestrator, whether to generate one or more additional evaluation requests after the evaluation precedence network is updated.

Example 12 includes the method of Example 11, and further includes generating an update notification that indicates the updated state; and receiving a confirmation to continue responsive to the update notification, wherein the determination of whether to generate the one or more additional evaluation requests is at least partially based on receipt of the confirmation.

Example 13 includes the method of Example 11 or Example 12, and further includes updating the evaluation precedence network to indicate the updated state after all of the evaluation results have been received.

Example 14 includes the method of any of Examples 11 to 13, and further includes assessing, at a change impact reasoner of the primary orchestrator, an impact of the change event based on the updated state of the evaluation precedence network; and performing the determination of whether to generate the one or more additional evaluation requests based on the assessed impact.

Example 15 includes the method of any of Examples 11 to 14 and further includes conveying the one or more evaluation requests and the evaluation results between the primary orchestrator and each of the one or more secondary orchestrators via a data bus.

Example 16 includes the method of Example 15 and further includes generating, at the primary orchestrator, each evaluation request according to a common evaluation request format, and wherein each of the evaluation results conveyed on the data bus has a common evaluation result format.

Example 17 includes the method of Example 15 or Example 16 and further includes receiving, at the primary orchestrator, multiple change event notifications via the data bus, wherein the multiple change event notifications include the notification of a change event, and wherein each change event notification of the multiple change event notifications has a common change event notification format.

Example 18 includes the method of any of Examples 11 to 17 and further includes, at a secondary orchestrator of the one or more secondary orchestrators, sending information corresponding to a particular evaluation request to a particular evaluation environment; receiving, from the particular evaluation environment, data associated with a completed evaluation; and sending, based on the data associated with the completed evaluation, a corresponding evaluation result to the primary orchestrator.

According to Example 19, a device includes a memory configured to store instructions; and a processor configured to execute the instructions to perform the method of any of Examples 11 to 18.

According to Example 20, a non-transitory, computer-readable medium stores instructions that, when executed by one or more processors, cause the one or more processors to perform the method of any of Examples 11 to 18.

According to Example 21, an apparatus includes means for carrying out the method of any of Examples 11 to 18.

According to Example 22, a non-transitory, computer-readable medium stores instructions that, when executed by one or more processors, cause the one or more processors to perform operations including: obtaining, at a primary orchestrator of a system, a notification of a change event from an authoritative source of the system; and identifying, based on an evaluation precedence network at the primary orchestrator, one or more evaluations to perform in response to the change event. The operations include, for each evaluation of the one or more identified evaluations: sending, from the primary orchestrator, an evaluation request associated with the evaluation to a respective secondary orchestrator of one or more secondary orchestrators of the system to request performance of the evaluation; and receiving, from the respective secondary orchestrator, an evaluation result based on performance of the evaluation. The operations also include updating the evaluation precedence network at the primary orchestrator to indicate an updated state of evaluation executions based on one or more of the evaluation results; and determining, at the primary orchestrator, whether to generate one or more additional evaluation requests after the evaluation precedence network is updated.

Example 23 includes the non-transitory, computer-readable medium of Example 22, wherein the operations further include: assessing, at a change impact reasoner of the primary orchestrator, an impact of the change event based on the updated state of the evaluation precedence network; and performing the determination of whether to generate the one or more additional evaluation requests based on the assessed impact.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:

one or more processors configured to:

obtain, at a primary orchestrator of a system, a notification of a change event from an authoritative source of the system;

identify, based on an evaluation precedence network at the primary orchestrator, one or more evaluations to perform in response to the change event;

for each evaluation of the one or more identified evaluations:

send, from the primary orchestrator, an evaluation request associated with the evaluation to a respective secondary orchestrator of one or more secondary orchestrators of the system to request performance of the evaluation; and receive, from the respective secondary orchestrator, an evaluation result based on performance of the evaluation;

update the evaluation precedence network at the primary orchestrator to indicate an updated state of evaluation executions based on one or more of the evaluation results; and determine, at the primary orchestrator, whether to generate one or more additional evaluation requests after the evaluation precedence network is updated.

2. The device of claim 1, wherein the one or more processors are configured to:

generate an update notification that indicates the updated state; and receive a confirmation to continue responsive to the update notification, wherein the determination of whether to generate the one or more additional evaluation requests is at least partially based on receipt of the confirmation.

3. The device of claim 1, wherein the one or more processors are configured to update the evaluation precedence network to indicate the updated state after all of the evaluation results have been received.

4. The device of claim 1, wherein the primary orchestrator includes a change impact reasoner that is configured to:

assess an impact of the change event based on the updated state of the evaluation precedence network; and perform the determination of whether to generate the one or more additional evaluation requests based on the assessed impact.

5. The device of claim 4, wherein the evaluation precedence network includes a graph network data structure comprising multiple nodes.

6. The device of claim 1, wherein each of the one or more secondary orchestrators are communicatively coupled to the primary orchestrator via a data bus, and wherein the data bus is configured to convey the evaluation requests and the evaluation results between the primary orchestrator and each of the one or more secondary orchestrators.

7. The device of claim 6, wherein the primary orchestrator is configured to generate each evaluation request according to a common evaluation request format, and wherein each of the evaluation results conveyed on the data bus has a common evaluation result format.

8. The device of claim 6, wherein the primary orchestrator is configured to receive multiple change event notifications via the data bus, wherein the multiple change event notifications include the notification of a change event, and wherein each change event notification of the multiple change event notifications has a common change event notification format.

9. The device of claim 1, wherein each of the one or more secondary orchestrators is coupled to one or more respective evaluation environments and is configured to:

send information corresponding to a particular evaluation request to a particular evaluation environment of the one or more respective evaluation environments;

receive, from the particular evaluation environment, data associated with a completed evaluation; and send, based on the data associated with the completed evaluation, a corresponding evaluation result to the primary orchestrator.

10. The device of claim 9, wherein each of the one or more secondary orchestrators includes:

an evaluation queue configured to store entries regarding requested evaluations; and a request processor configured to:

add entries to the evaluation queue based on received evaluation requests;

remove entries from the evaluation queue based on completed evaluations; and send data of the completed evaluations to an artifact storage.

11. A method comprising:

obtaining, at a primary orchestrator of a system, a notification of a change event from an authoritative source of the system;

identifying, based on an evaluation precedence network at the primary orchestrator, one or more evaluations to perform in response to the change event;

for each evaluation of the one or more identified evaluations:

sending, from the primary orchestrator, an evaluation request associated with the evaluation to a respective secondary orchestrator of one or more secondary orchestrators of the system to request performance of the evaluation; and receiving, from the respective secondary orchestrator, an evaluation result based on performance of the evaluation;

updating the evaluation precedence network at the primary orchestrator to indicate an updated state of evaluation executions based on one or more of the evaluation results; and determining, at the primary orchestrator, whether to generate one or more additional evaluation requests after the evaluation precedence network is updated.

12. The method of claim 11, further comprising:

generating an update notification that indicates the updated state; and receiving a confirmation to continue responsive to the update notification, wherein the determination of whether to generate the one or more additional evaluation requests is at least partially based on receipt of the confirmation.

13. The method of claim 11, further comprising updating the evaluation precedence network to indicate the updated state after all of the evaluation results have been received.

14. The method of claim 11, further comprising:

assessing, at a change impact reasoner of the primary orchestrator, an impact of the change event based on the updated state of the evaluation precedence network; and performing the determination of whether to generate the one or more additional evaluation requests based on the assessed impact.

15. The method of claim 11, further comprising conveying the one or more evaluation requests and the evaluation results between the primary orchestrator and each of the one or more secondary orchestrators via a data bus.

16. The method of claim 15, further comprising generating, at the primary orchestrator, each evaluation request according to a common evaluation request format, and wherein each of the evaluation results conveyed on the data bus has a common evaluation result format.

17. The method of claim 15, further comprising receiving, at the primary orchestrator, multiple change event notifications via the data bus, wherein the multiple change event notifications include the notification of the change event, and wherein each change event notification of the multiple change event notifications has a common change event notification format.

18. The method of claim 11, further comprising, at a secondary orchestrator of the one or more secondary orchestrators:

sending information corresponding to a particular evaluation request to a particular evaluation environment;

receiving, from the particular evaluation environment, data associated with a completed evaluation; and sending, based on the data associated with the completed evaluation, a corresponding evaluation result to the primary orchestrator.

19. A non-transitory, computer-readable medium storing instructions that, when executed by one or more processors, cause the one or more processors to perform operations including:

obtaining, at a primary orchestrator of a system, a notification of a change event from an authoritative source of the system;

identifying, based on an evaluation precedence network at the primary orchestrator, one or more evaluations to perform in response to the change event;

for each evaluation of the one or more identified evaluations:

sending, from the primary orchestrator, an evaluation request associated with the evaluation to a respective secondary orchestrator of one or more secondary orchestrators of the system to request performance of the evaluation; and receiving, from the respective secondary orchestrator, an evaluation result based on performance of the evaluation;

updating the evaluation precedence network at the primary orchestrator to indicate an updated state of evaluation executions based on one or more of the evaluation results; and determining, at the primary orchestrator, whether to generate one or more additional evaluation requests after the evaluation precedence network is updated.

20. The non-transitory, computer-readable medium of claim 19, wherein the operations further comprise:

assessing, at a change impact reasoner of the primary orchestrator, an impact of the change event based on the updated state of the evaluation precedence network; and performing the determination of whether to generate the one or more additional evaluation requests based on the assessed impact.

* * * * *